United States Patent [19]

Yeh

[11] Patent Number: 5,843,275

[45] Date of Patent: Dec. 1, 1998

[54] AUTOMATIC MACHINE FOR CUTTING, FUSING, AND REELING RAW MATERIAL PLATES OF PLASTIC MATERIAL

[76] Inventor: Tien-fu Yeh, No. 53, Alley 87, Lane 538, Sec. 4, An Ho Rd., Tainan, Taiwan

[21] Appl. No.: 540,511

[22] Filed: Oct. 10, 1995

[51] Int. Cl.[6] ..................................................... B30B 5/02
[52] U.S. Cl. ..................... 156/583.9; 156/507; 156/511; 156/510; 156/515; 156/512; 156/583.1; 156/580; 156/543
[58] Field of Search ................................. 156/517, 304.6, 156/499, 304.2, 558, 518, 515, 512, 511, 507, 502, 353, 510, 538, 543, 580, 503.1, 583.9

[56] References Cited

U.S. PATENT DOCUMENTS

| | | | |
|---|---|---|---|
| 3,935,056 | 1/1976 | Koyama et al. | 156/507 |
| 4,082,592 | 4/1978 | Raabe et al. | 156/153 |
| 4,443,288 | 4/1984 | Swada et al. | 156/304.6 |
| 4,496,407 | 1/1985 | Lowery, Sr. et al. | 156/73.3 |
| 4,552,602 | 11/1985 | Landsness | 156/157 |
| 5,314,568 | 5/1994 | Ryan | 156/504 |
| 5,415,722 | 5/1995 | Yeh | 156/512 |

*Primary Examiner*—Merrick Dixon
*Attorney, Agent, or Firm*—Townsend and Townsend and Crew LLP

[57] ABSTRACT

A machine for processing raw material plates includes a feeding assembly, a first transportation assembly for moving raw material plates to a front clamping assembly which is used to clamp a first raw material plate for subsequent cutting of an irregular front end of the first raw material plate by a front electric heating assembly. The machine further includes a movable table device for moving the first raw material plate to a rear clamping assembly for subsequent cutting of an irregular rear end of the first raw material plate by a rear electric heating assembly. The rear electric heating assembly has a further function for fusing the cut front end of the first raw material plate to a previously fused material web before the cutting of the rear end of the fused material web. A second transportation assembly is provided to feed the first raw material plate to the rear electric heating assembly. The machine further includes a side cutting assembly for cutting the sides of the fused material web and a third transportation assembly for feeding the material web to a reel assembly.

26 Claims, 23 Drawing Sheets

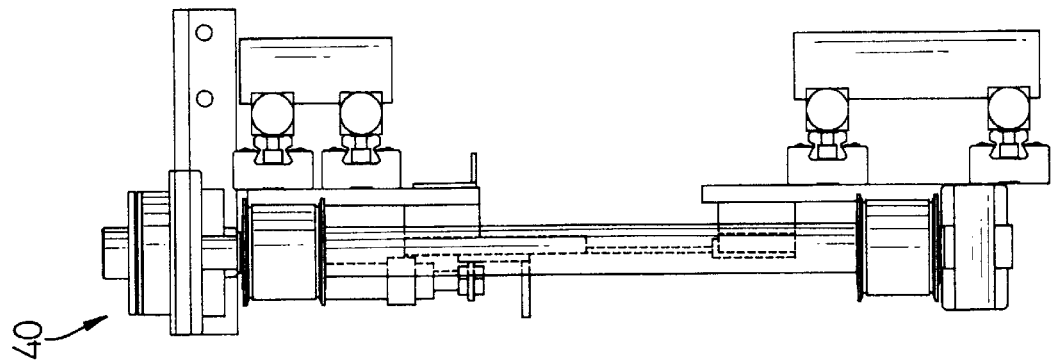
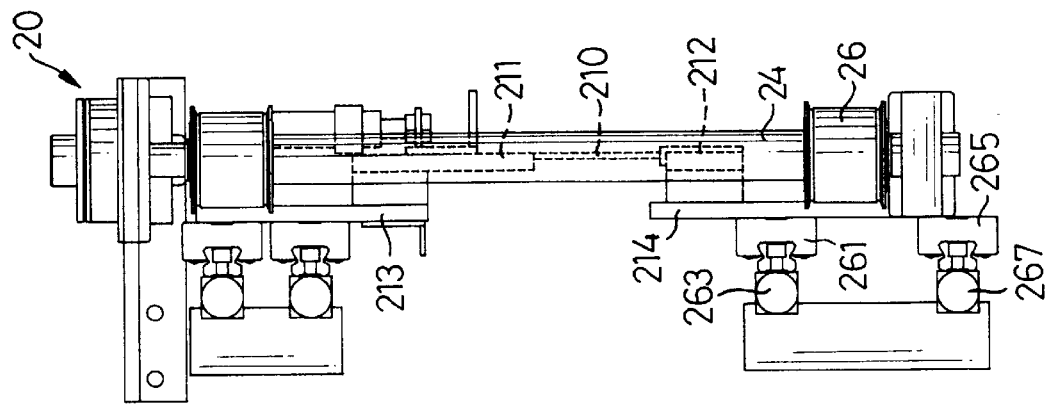
FIG. 4

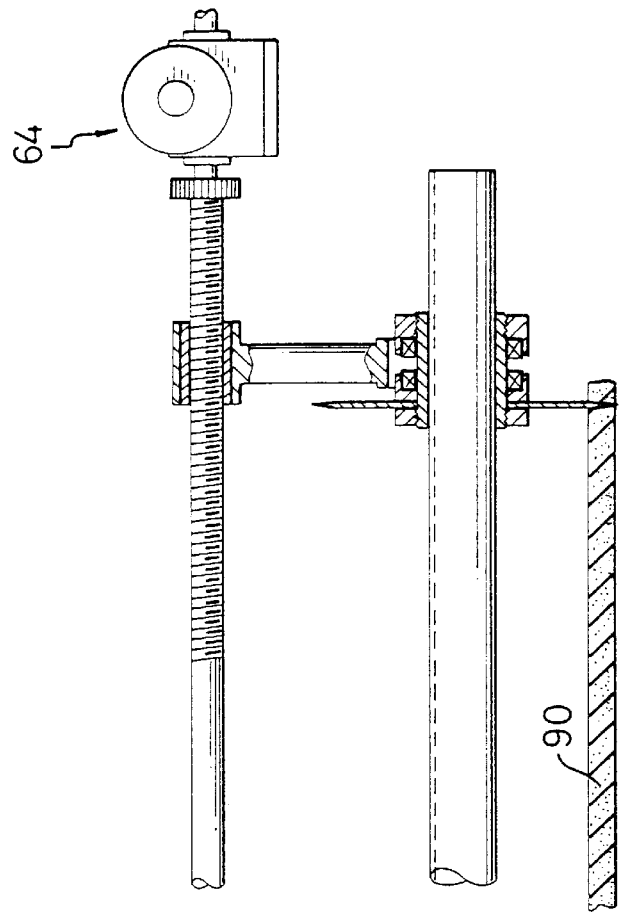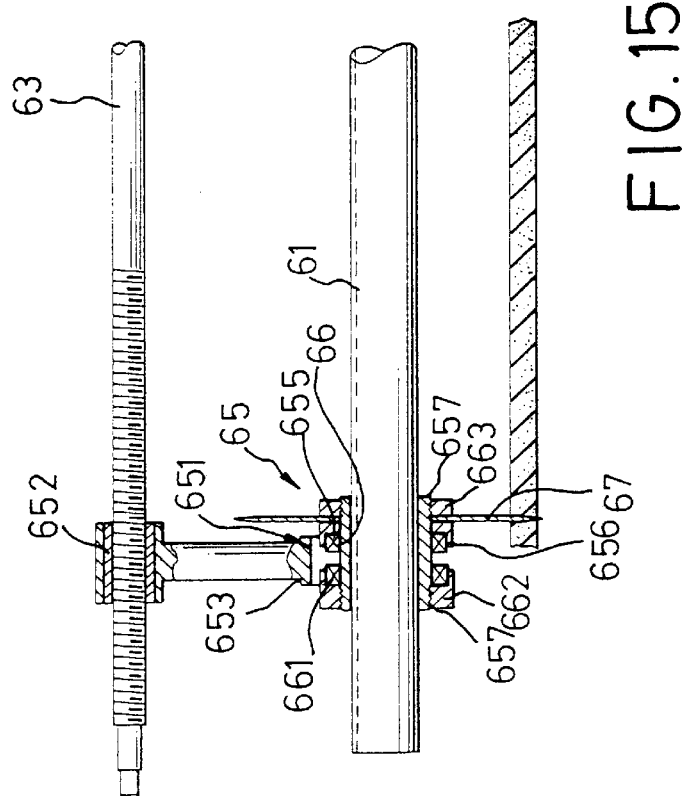
FIG.15

5,843,275

AUTOMATIC MACHINE FOR CUTTING, FUSING, AND REELING RAW MATERIAL PLATES OF PLASTIC MATERIAL

BACKGROUND OF THE INVENTION

1. Field of the Invention

The present invention relates to an automatic machine for cutting, fusing, and reeling raw material plates of plastic material such as polyethylene (PE) or ethylene vinyl acetate (EVA).

2. Description of Related Art

Presently, for manufacturing shoe soles, rectangular thick raw plastic foam material plates which are made by foam formation technique and are irregular in shape along their perimeters are used. The thick raw material plates are cut to have straight edges and are sliced into a number of thinner plates of a standard size under many cutting procedures. The thinner plates are glued or fused together at their ends to form a web of material plate which is coiled around a reel for subsequent use in making the shoe soles.

In addition to a plurality of mechanisms, a considerable number of workers are required to move and stack the raw material plates and the reels. Furthermore, too many processing steps are involved and this causes a waste in time and raw material and results in poor quality of products. Although machines have been proposed to handle the melting and reeling of the raw material plates, the raw material plates are still manually cut and workers are still required to move the raw material plates to the fusion machine. For environmental consideration, reclaimed material, achieved by adding stone powder, is also used to manufacture plastic plates which are harder and thus cannot be effectively rolled by the above-mentioned machines during the fusion thereof.

The present invention provides an automatic machine to solve the above-mentioned problems.

SUMMARY OF THE INVENTION

The present invention provides a machine for processing raw material plates of polyethylene (PE) or ethylene vinyl acetate (EVA). The machine includes a feeding assembly for feeding raw material plates, and a first transportation assembly for moving raw material plates to a front clamping assembly which is used to clamp a first raw material plate for subsequent cutting of an irregular front end of the first raw material plate by a front electric heating assembly. The machine further includes a movable table means for moving the first raw material plate to a rear clamping assembly for subsequent cutting of an irregular rear end of the first raw material plate by a rear electric heating assembly. The rear electric heating assembly has a further function for fusing the cut front end of the first raw material plate to a previously fused material web before the cutting of the rear end of the fused material web. A second transportation assembly is provided to feed the first raw material plate to the rear electric heating assembly. The machine further includes a side cutting assembly for cutting the sides of the fused material web and a third transportation assembly for feeding the material web to a reel assembly.

Other objects, advantages, and novel features of the invention will become more apparent from the following detailed description when taken in conjunction with the accompanying drawings.

BRIEF DESCRIPTION OF THE DRAWINGS

FIG. 4 is an end view of the front and rear electrical heating assembly in accordance with the present invention;

FIG. 15 is a partially cross sectional schematic view of the side cutting assembly;

DESCRIPTION OF THE PREFERRED EMBODIMENT

Figure 1:
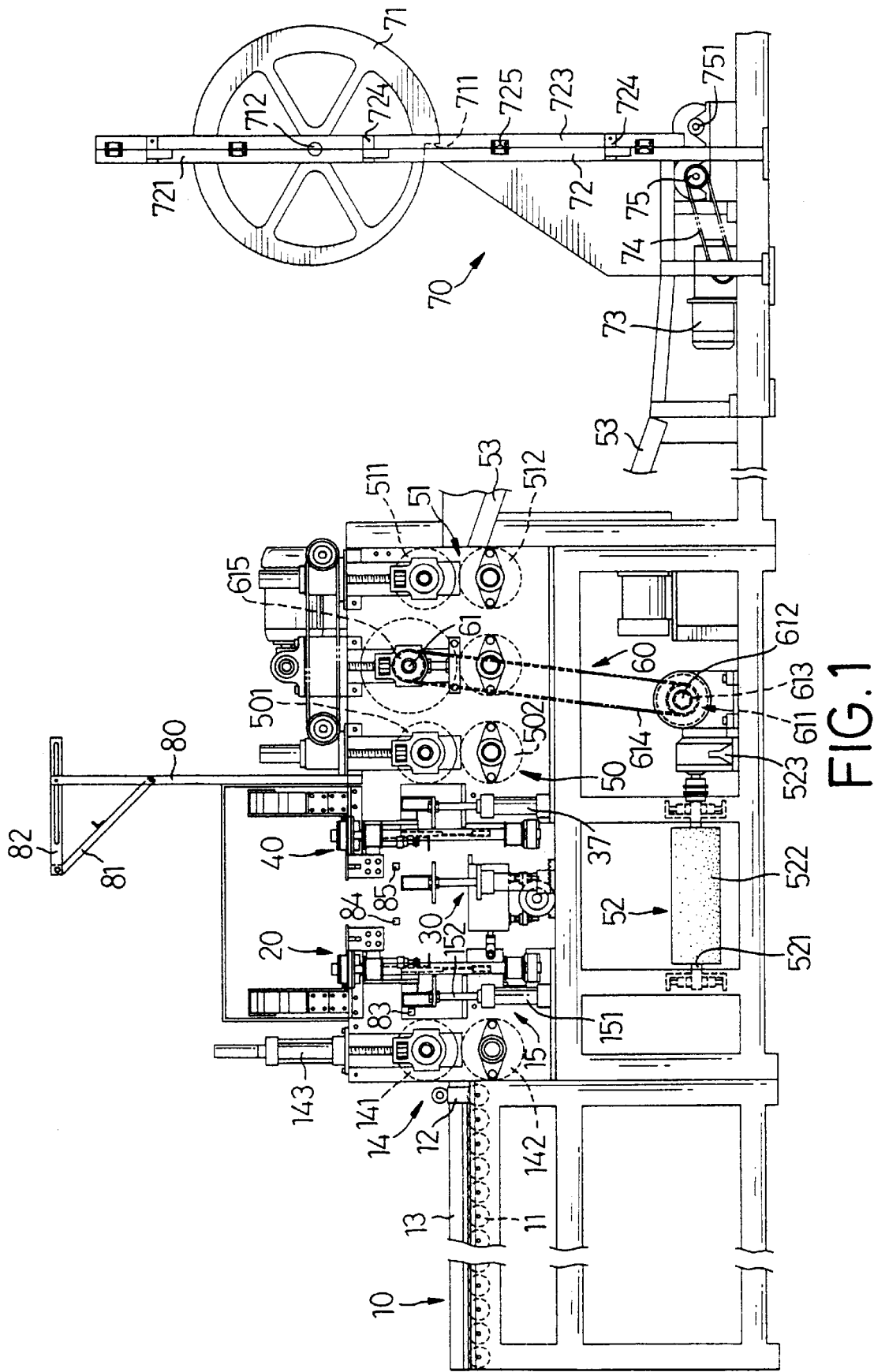
FIG. 1 is a side elevational view of an automatic cutting/ fusion/reeling machine in accordance with the present invention.

Referring to the drawings and initially to FIG. 1, a machine for processing plastic material such as polyethylene (PE) or ethylene vinyl acetate (EVA) includes a feeding assembly 10, a first transportation assembly 14, a front clamping assembly 15, a front electric heating assembly 20 for cutting a front end of a new, incoming raw material plate, a movable table means 30, a rear clamping assembly 37, a rear electric heating assembly 40 for fusing a new, incoming raw material plate to a previously fused material web and cutting a rear end of the fused material web, a second transportation assembly 50, a side cutting assembly 60 for cutting the sides of the fused material web, a third transportation assembly 51, and a reel assembly 70 for reeling the fused material web.

The feeding assembly 10 includes a plurality of feeding rollers 11 which are freely rotatable and are mounted on a frame (not labeled). A positioning track 12 is mounted to each of two sides of the frame to guide the raw material plates (not shown in this figure) fed by the feeding rollers 11. A pair of positioning plates 13 are mounted on the frame and extend across the feeding rollers 11, a distance between the positioning plates 13 being adjustable so as to be equal to a width of the raw material plates to be fed to the front electric heating assembly 20 via the transportation of the first transportation assembly 14.

The first transportation assembly 14 includes an upper positioning wheel 141 and a lower rotational wheel 142. A pneumatic cylinder device 143 is provided to vertically urge the upper positioning wheel 141. The lower rotational wheel 142 is rotatable under the control of a motor or other suitable driving means.

The front clamping assembly 15 includes a fixed plate 154 (see FIG. 19) and a movable plate 153 which is attached to and thus vertically urged by a distal end of a piston rod 152 of each of two pneumatic cylinders 151 (only one is shown) mounted therebelow.

The front electric heating assembly 20 and the rear electric heating assembly 40 have a similar structure; therefore only the front electric heating assembly 20 will be described hereinafter. Referring to FIGS. 2 to 7, the front electric heating assembly 20 includes a heating blade unit 21 which is horizontally carried by a sliding block 220 of a pneumatic cylinder means 22. The electricity is supplied by electric source wires to a heating plate (not labeled), the electric source wires extending through a protective sheath 23, such that the wires does not tangle during reciprocatable horizontal movement of the heating blade unit 21.

Figure 7:
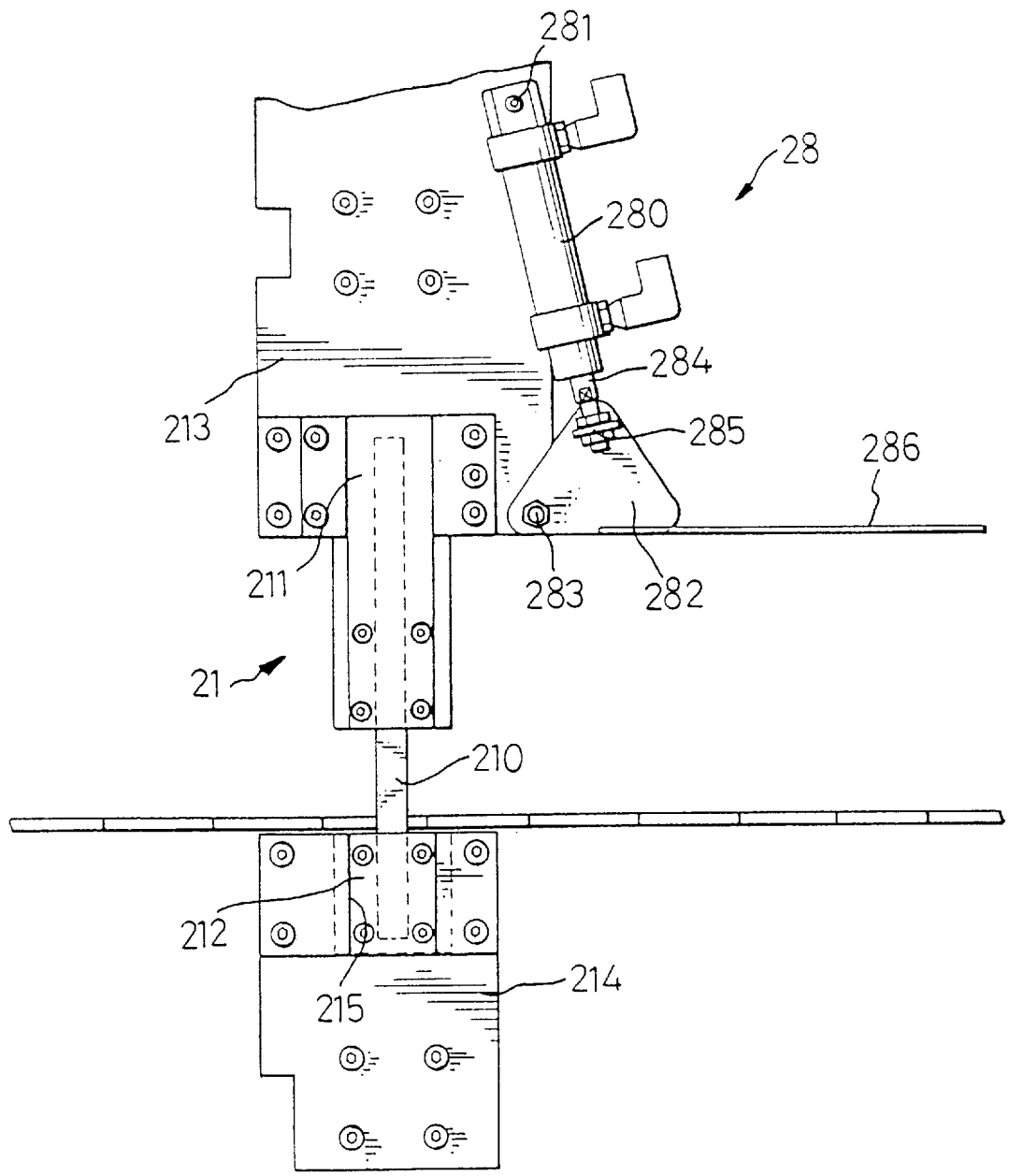
FIGS. 7 and 8 are side elevational views illustrating operation of the heating blade unit of the front electric heating assembly.

Referring to FIG. 7, the heating blade unit 21 includes a blade 210 which is vertically adjustable and is securely held between upper and lower plates 211 and 212 in which the upper plate 211 is securely attached to an upper positioning seat 213, while the lower plate 212 includes a dovetail arrangement to cooperate with a vertical dovetail groove 215 in a lower positioning seat 214, the lower plate 212 thus being vertically slidable relative to the lower positioning seat 214. The upper and lower plates 211 and 212 and upper and lower positioning seats 213 and 214 are made of heat conducting material, such as copper, and are interconnected by heat conducting wires. When the blade 210 expands along its lengthwise direction, i.e., in the vertical direction, the lower plate 212 is moved downwardly to avoid deformation of the blade 210, and thus enhances the cutting quality of the material plates.

Figure 2:
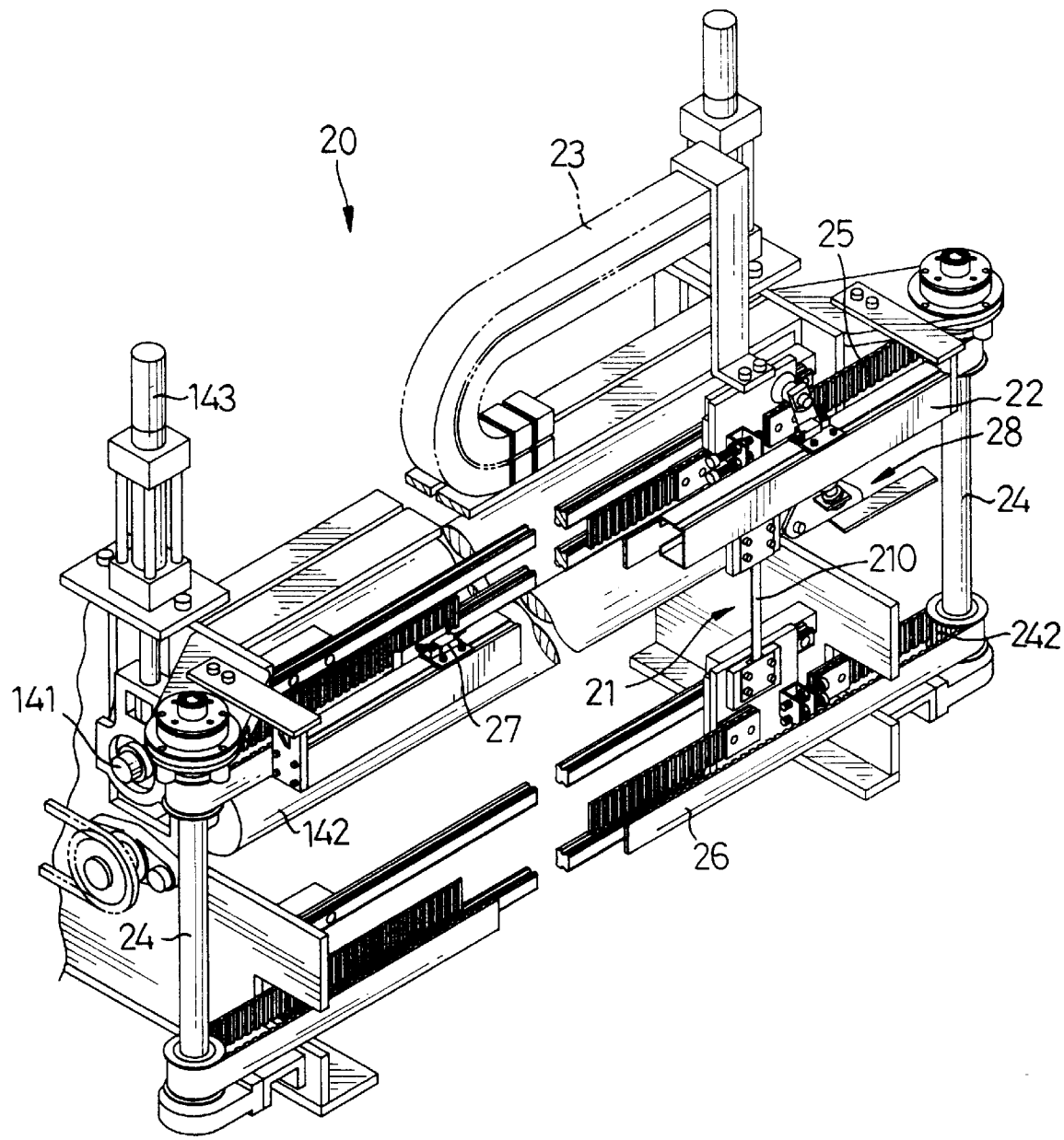
FIG. 2 is a perspective view illustrating the front electric heating assembly in accordance with the present invention.

As shown in FIG. 2, in order to make the upper and lower ends of the blade 210 move synchronously and horizontally under operation of the pneumatic cylinder means 22, a transmitting means which comprises two vertical shafts 24 disposed at two opposite sides of the machine, a driving belt 25, and a driven belt 26 is provided. Each of the shafts 24 has an upper end and a lower end and each of the two ends has an appropriately splined portion 242. Each of the driving and driven belts 25, 26 is a belt having a toothed face and two ends. The driving belt 25 is mated around the upper ends of the shafts 24 with the toothed face thereof engaging with the splined portions of the upper ends, and the two ends thereof are coupled to the upper positioning seat 213. Similarly, the driven belt 26 is circled around the lower ends of the shafts 24 with the toothed face thereof engaging with the splined portions of the lower ends, and the two ends thereof are coupled to the lower positioning seat 214.

Figure 3:
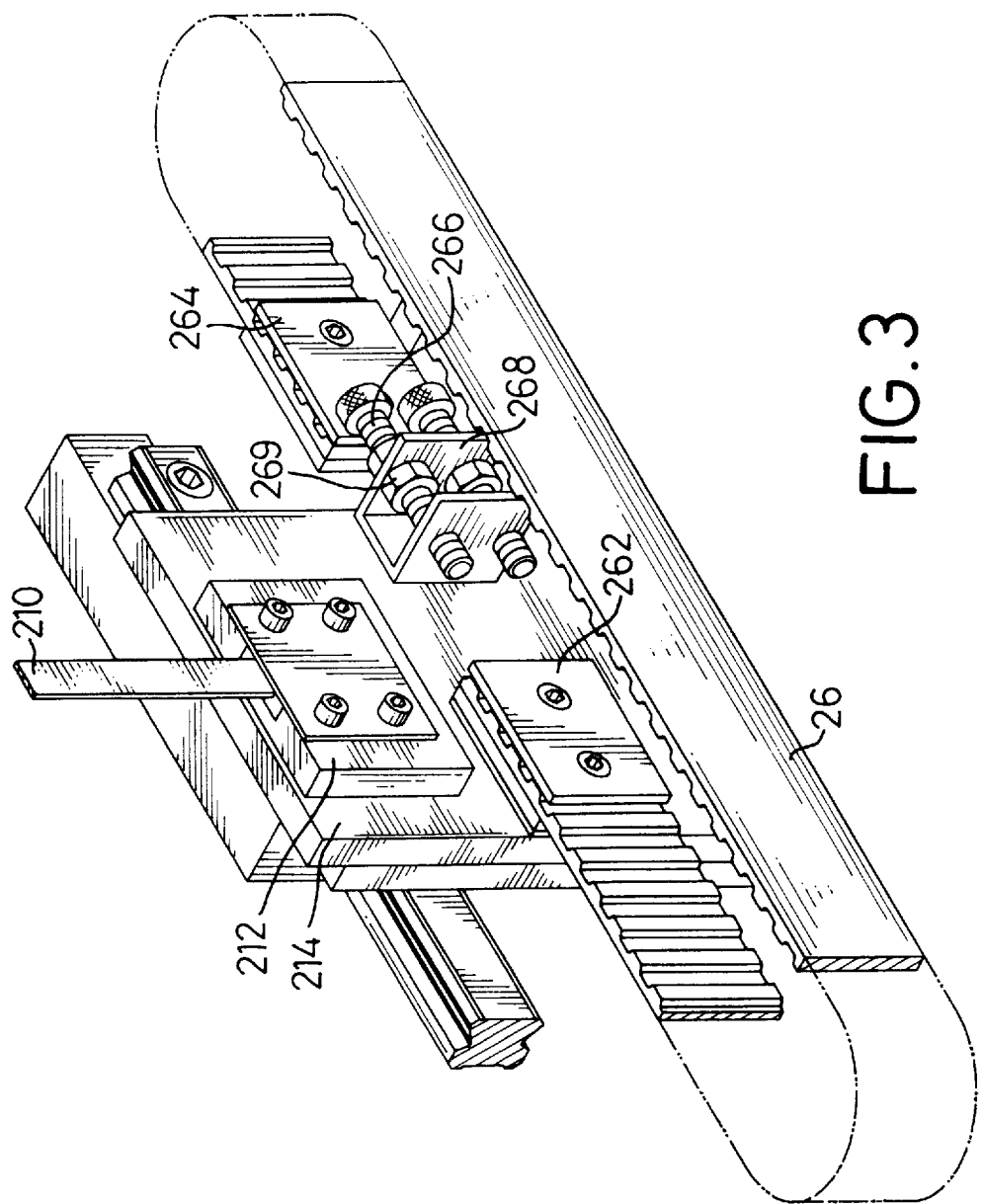
FIG. 3 is an enlarged perspective view illustrating the detailed connecting structure between the lower positioning seat and the driven belt of the front electric heating assembly.

Because the connecting arrangement between the driving belt 25 and the upper positioning seat 213 is the same as that between the driven belt 26 and the lower positioning seat 214, the connecting arrangement between the driven belt 26 and the lower positioning seat 214 will be discussed herein as an explanatory description. Referring now to FIG. 3, one end of the driven belt 26 is clamped by two clamping plates 262 and fixedly secured to lower positioning seat 214. The other end of the driven belt 26 is adjustably connected to the lower positioning seat 214 for adjusting the tension of the driven belt 26. Preferably, this end of the driven belt 26 is clamped by two clamping plates 264 which have two screws 266 attached thereto. The screws 266 are then extended through a connecting plate 268 which is securely attached on the lower positioning seat 214. The screws 266 are adjustably secured to the plate 268 by lock nuts 269, and a tension of the driven belt 26 can be adjusted by adjusting the lock nuts 269.

Referring further to FIG. 4, the lower positioning seat 214, preferably, further has a first sliding bracket 261 and movably engaging with a first horizontal guiding rail 263 and a second sliding chunk 265 movably engaging with a second horizontal guiding rail 267. Thus, in conjunction with a similar arrangement provided to the upper positioning seat 213, the movement of the heating blade unit 21 will be smooth and steady.

Figure 5:
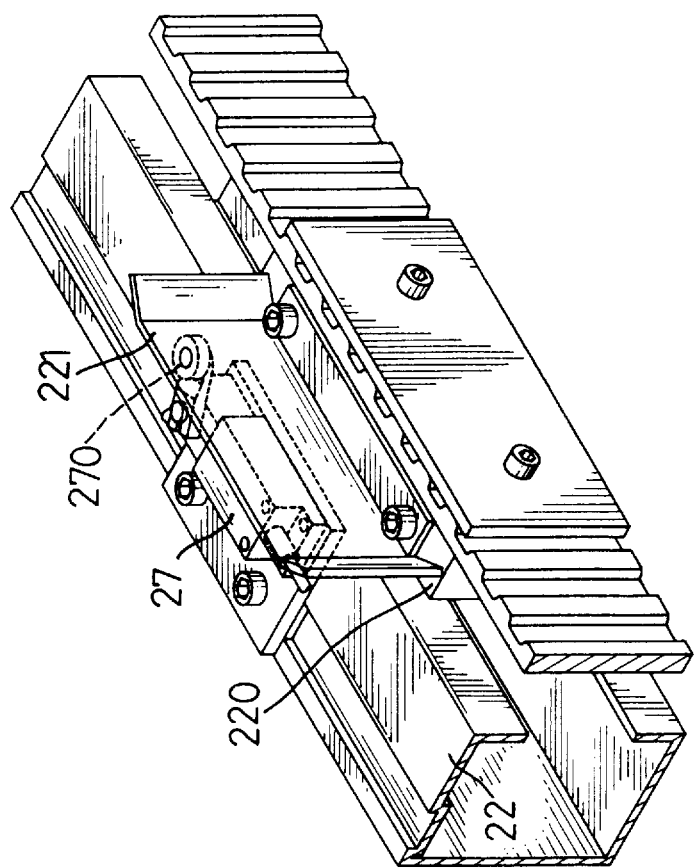
FIG. 5 is an enlarged perspective view illustrating the detailed relationship between the switch device and the pneumatic cylinder.
Figure 6:
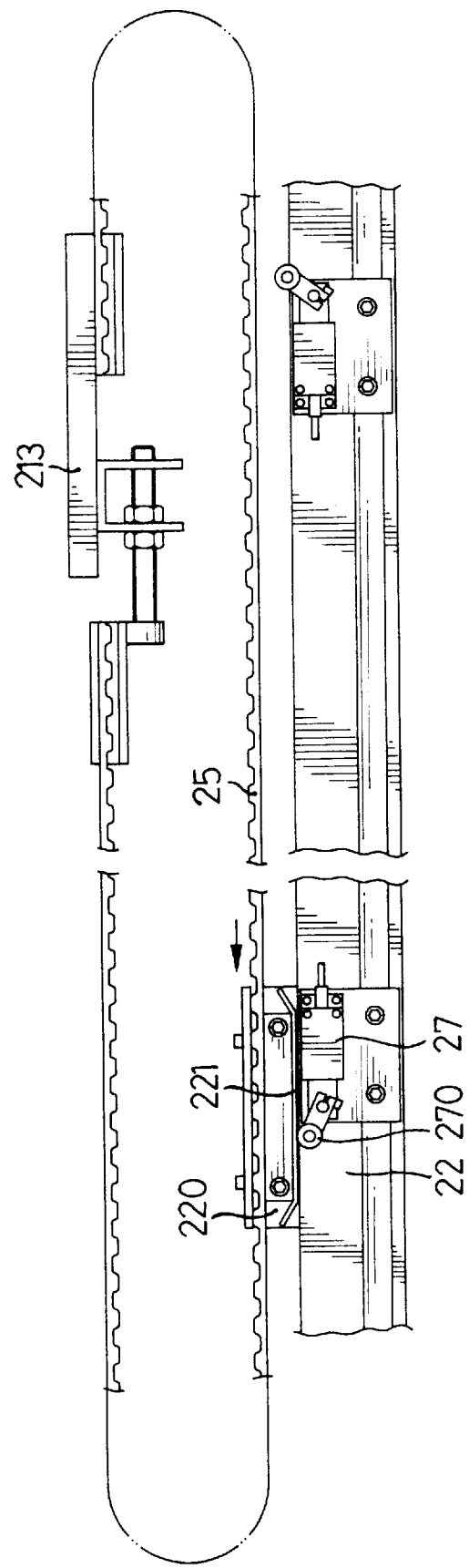
FIG. 6 is a top view of FIG. 5.

Referring to FIGS. 2, 5 and 6, the driving belt 25 is secured to the sliding block 220 of the pneumatic cylinder means 22 such that the heating blade unit 21 is moved by the sliding block 220 through the driving belt 25. The sliding block 220 further has a trigger plate 221 vertically attached to an upper face thereof and two lateral sides of the plate 221 are inwardly bent. Two switch devices 27 are movably mounted on an upper face of the pneumatic cylinder means 22 to define a stroke length of the heating blade unit 21 in accordance with the width of the material web. Each of the switch devices 27 has a lever 270 extending therefrom such that when the trigger plate 221 of the sliding block 220 of the pneumatic cylinder means 22 is moved along one direction to contact with the lever 270 of one of the switch devices 27, the lever 270 will cause the switch device 270 to send a signal to the pneumatic cylinder means 22 to stop the sliding block 220 and reversely move the sliding block 220 until it contacts the lever 270 of the other switch device 27.

Figure 8:
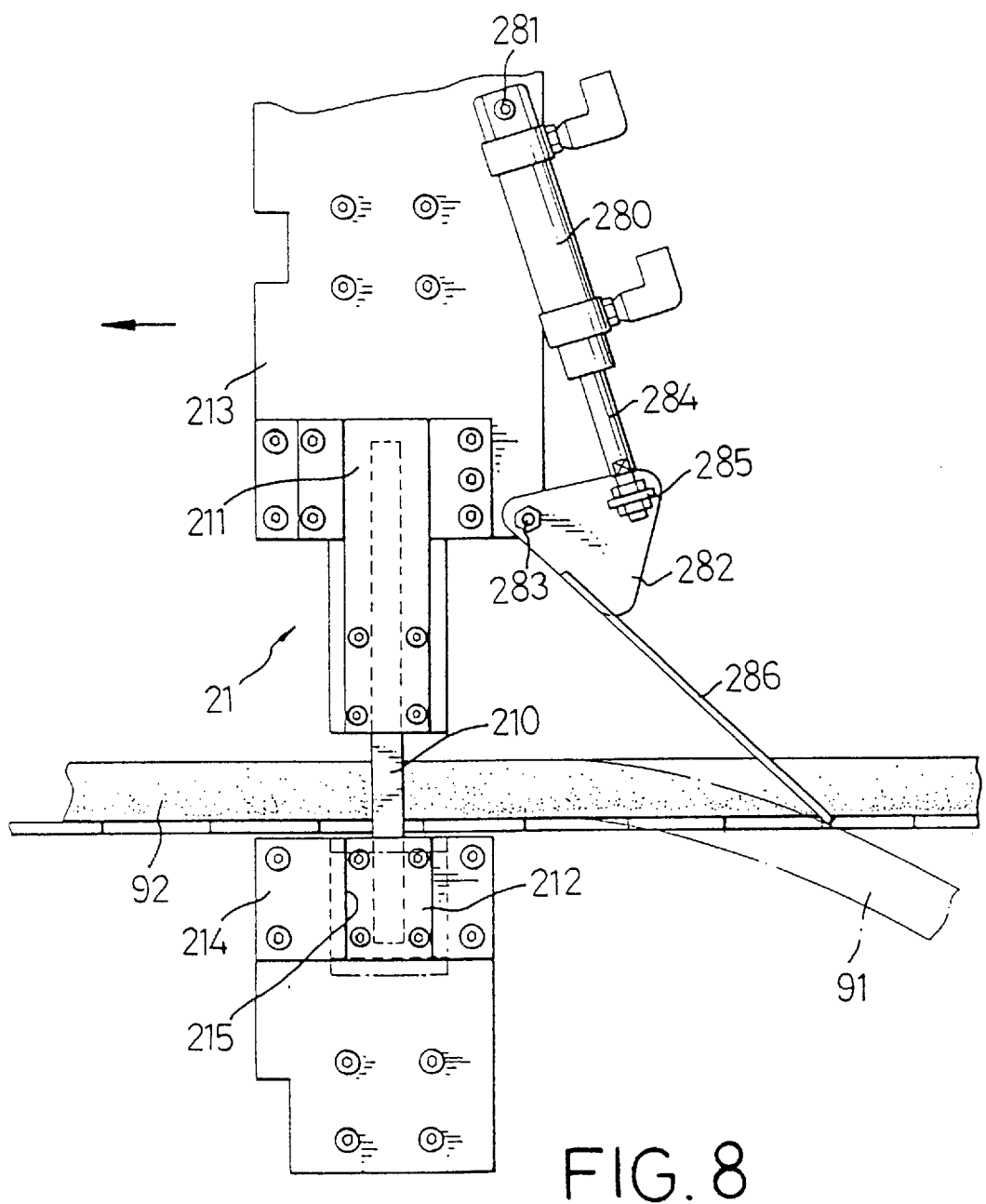

Referring to FIGS. 2, 7 and 8, a waste material dispensing device 28 is provided to the heating blade unit 21 and includes a pneumatic cylinder 280 whose upper end is pivoted to an upper section of the upper positioning seat 213 by a pivotal axle 281. A triangular plate 282 is pivoted at one of its corners to a lower section of the upper positioning seat 213 by a second pivotal axle 283. A second corner of the plate 282 is connected to a distal end of a piston rod 284 of cylinder 280 by a pivotal seat 285. An operative member 286 extends along one side of the triangular plate 282. The same arrangement of waste material dispensing device is provided to the rear electric heating assembly 40.

Figure 12:
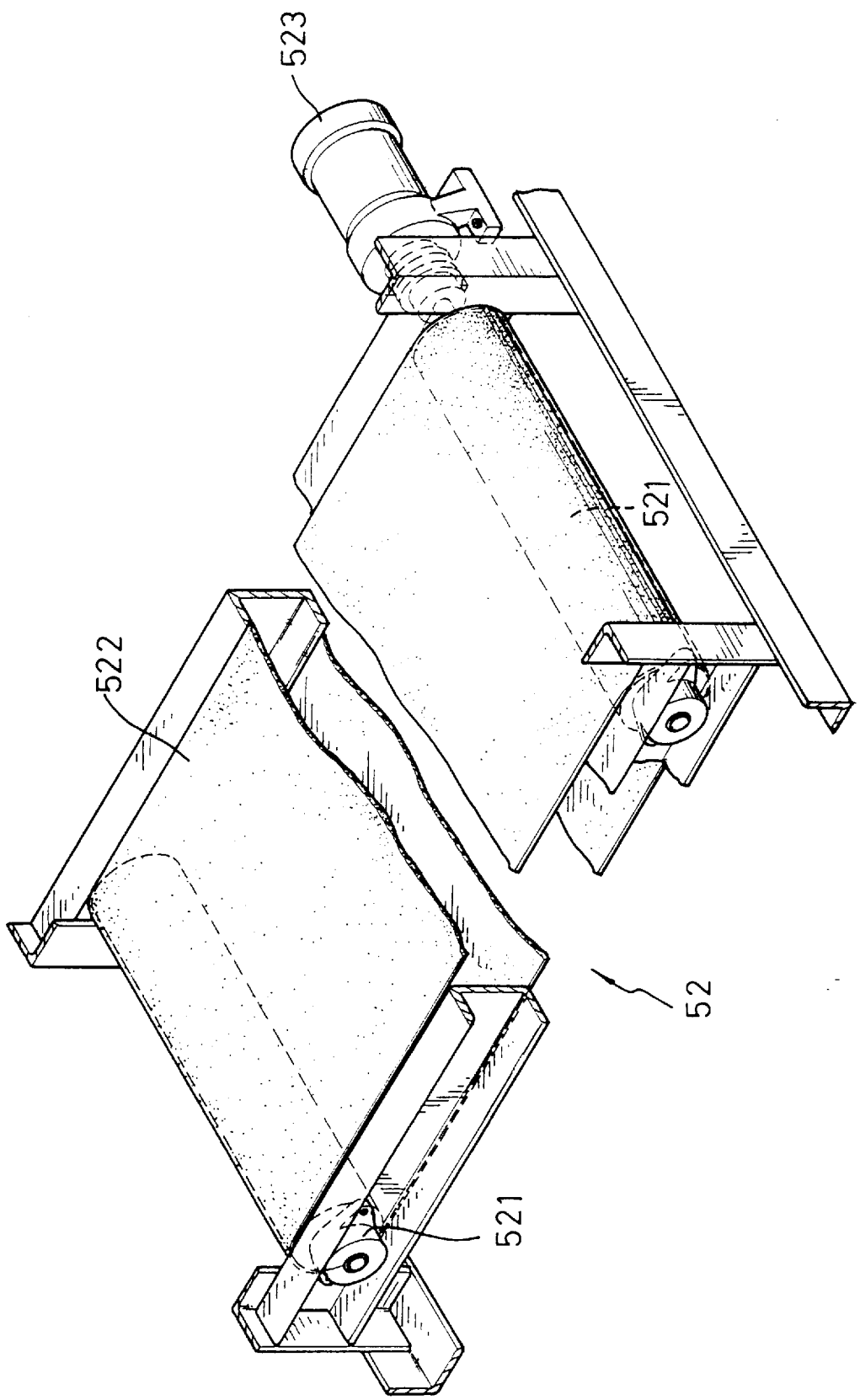
FIG. 12 is a perspective view illustrating a conveyor device for waste material of the machine in accordance with the present invention.

Referring to FIGS. 2 and 7, when the front heating blade unit 21 has finished cutting a front end of the material plate and is about to return to its original position, or the rear heating blade unit 41 is under fusing procedure, the operative member 286 of the waste material dispensing device 28 is in a substantially horizontal position, as shown in FIG. 7. When the front heating blade unit 21 has finished cutting the front end of the incoming new raw material plate 92, the piston rod 284 moves downwardly to urge the triangular plate 282 to pivot through a certain degree such that the operative member 286 exerts a downward force on waste material 91 [see FIG. 8], which accordingly falls on a waste conveyor means 52. Similar operation is made after the rear heating blade unit 41 has cut the rear end of the fused material plate 90. Referring to FIGS. 1 and 12, the waste conveyor means 52 includes a belt 522 mounted around two transverse rollers 521 one of which is driven by a motor 523.

Figure 9:
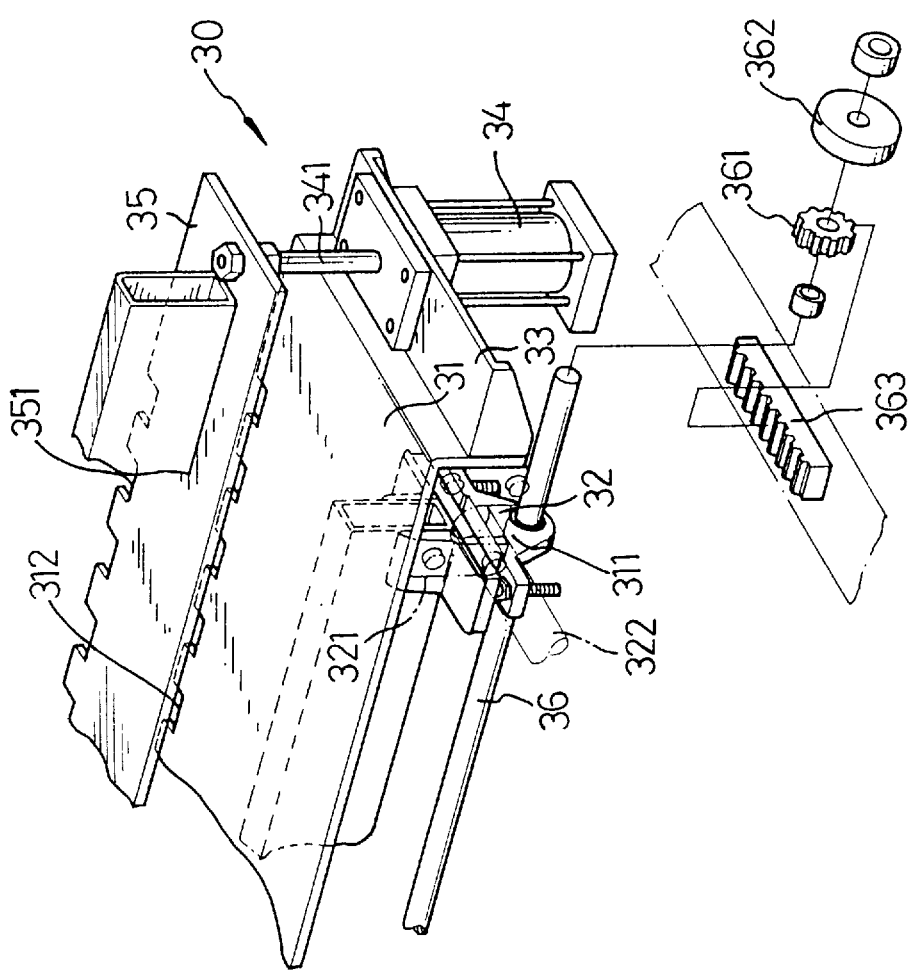
FIG. 9 is a perspective view illustrating the movable table means of the machine in accordance with the present invention.
Figure 10:
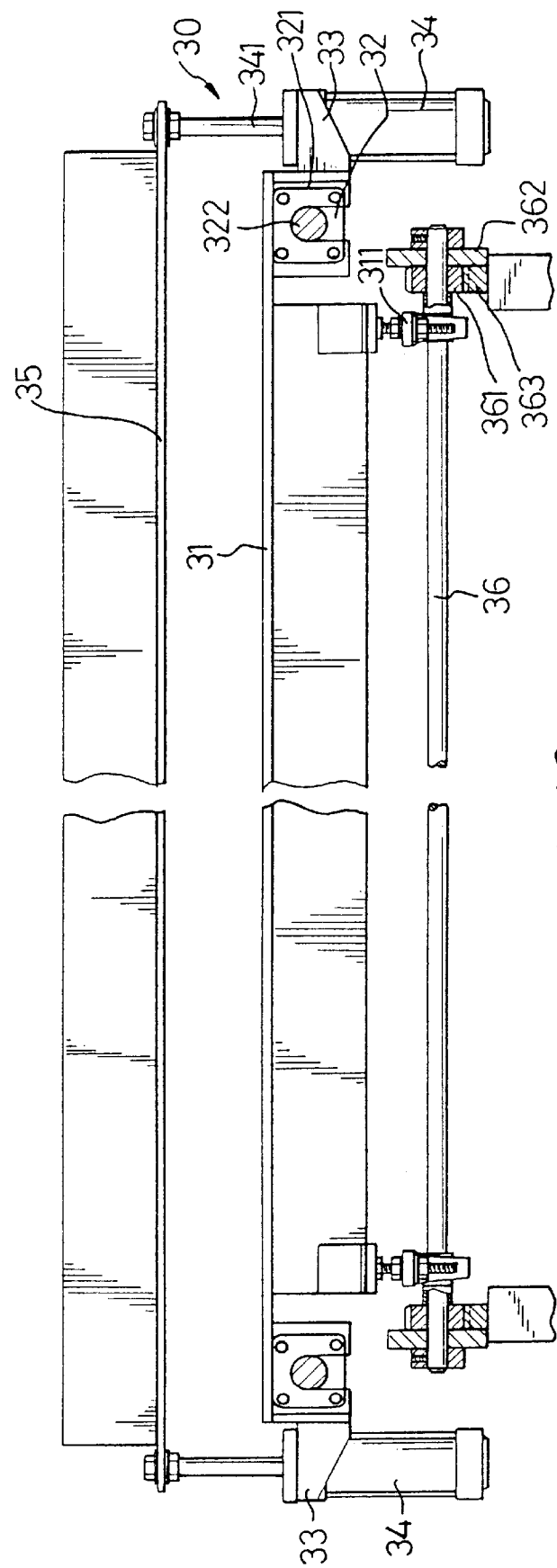
FIG. 10 is a side elevational view of the movable table means.

Referring to FIGS. 1, 9 and 10, the movable table means 30 includes a table 31 which is mounted to respective bodies 322 of two pneumatic cylinders 32 (only one is shown) and thus carriable by the latter to move horizontally. A mounting plate 33 is mounted to each of front and rear ends of the table 31 for mounting a vertical pneumatic cylinder 34. The piston rods 341 of the cylinders 34 together carry a clamping plate 35 vertically. Piston rods 321 of cylinders 32 carry the table 31, the vertical cylinders 34, as well as the clamping plate 35 to move horizontally, while the vertical cylinders 34 carry the clamping plate 35 to move vertically.

A pair of axles 36, which extend in a direction parallel to the longitudinal axis of the table 31, are secured below the table 31 by two positioning bars 311. A gear 361 and a positioning wheel 362 are mounted on each of two ends of each axle 36, in which the positioning wheel 362 rests on the frame of the machine and the gear 361 meshes with a rack 363. By such an arrangement, displacements of the two sides of the movable table 30 are synchronous to each other to ensure perfect fusion between two raw material plates. One edge of the clamping plate 35 has castellations 351 therein and the table 31 has castellations 312 in an associated edge.

Figure 11:
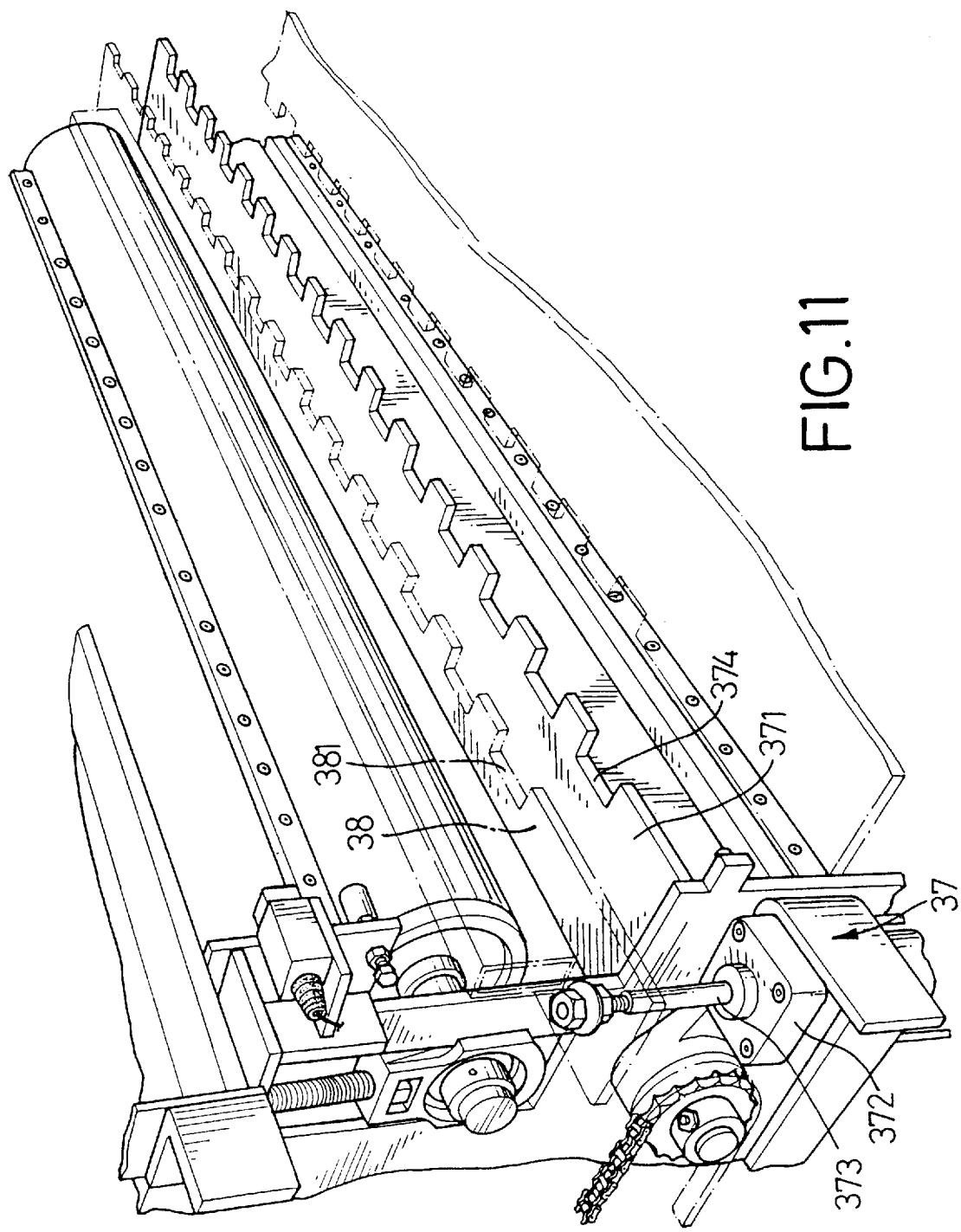
FIG. 11 is a perspective view illustrating a rear clamping assembly in accordance with the present invention.

Referring now to FIG. 11, the rear clamping assembly 37 is mounted after the movable table means 30 and includes a fixed plate 371 and a movable plate 38 which is attached to and thus vertically carried by a piston rod 373 of each of two vertical pneumatic cylinders 372 (only one is shown). The fixed plate 371 and the movable plate 38 also have castellations 374 and 381 in associated edges thereof for fittingly mating with the castellations in the table 31 and the clamping plate 35.

Referring back to FIG. 1, the second transportation assembly 50 includes an upper positioning wheel 501 and a lower rotational wheel 502. An adjusting screw device (not labeled) is provided to an upper section of the upper positioning wheel 501 for adjusting the height of the latter, while the lower rotational wheel 502 is driven by a motor or other suitable driving means. The third transportation assembly 51 also includes an upper positioning wheel 511 and a lower rotational wheel 512. An adjusting screw device (not labeled) is provided to the upper section of the upper positioning wheel 511 for adjusting the height of the latter, while the lower rotational wheel 512 is driven by a motor or other suitable driving means.

Referring to FIGS. 1 and 13 through 15, the side cutting assembly 60 includes upper and lower guiding axles 61 and 62. An adjusting screw 63 is provided above the upper guiding axle 61 and includes two threaded end sections, one of the threaded end sections being right-handed and the other being left-handed. A driving means, such as a motor 64, is provided to drive the adjusting screw 63. A pair of tools or cutter subassemblies 65 are mounted on the upper guiding axle 61. Each cutter subassembly 65 includes a positioning seat 651 which has a sleeve 652 which has inner threading and is freely and rotatably mounted to an upper end thereof for receiving the screw section of the adjusting screw 63 and a substantially arc-shaped member 653 at a lower end thereof. The cutter subassembly 65 further includes a main sleeve 655 with a positioning ring 656 which is mounted around a mediate section of a periphery thereof and which has two threaded ends 657. Referring to FIG. 15, a thrust bearing 66 is mounted into the positioning ring 656, and a cutting disc 67 mounted to the right side of the positioning ring 656 is retained by a nut 663 engaged on the threaded end 657. Then, the arc-shaped member 653 is mounted around the main sleeve 655 and is retained by two pins 658 passing through pin holes 654 [see FIG. 14] formed therein and frictionally engaging the outer periphery of the main sleeve 655, thereby holding the thrust bearing 66 in one side of the arc-shaped member 653. A second thrust bearing 661 is mounted into the other side of the arc-shaped member 653 and is retained by another nut 662.

Figure 13:
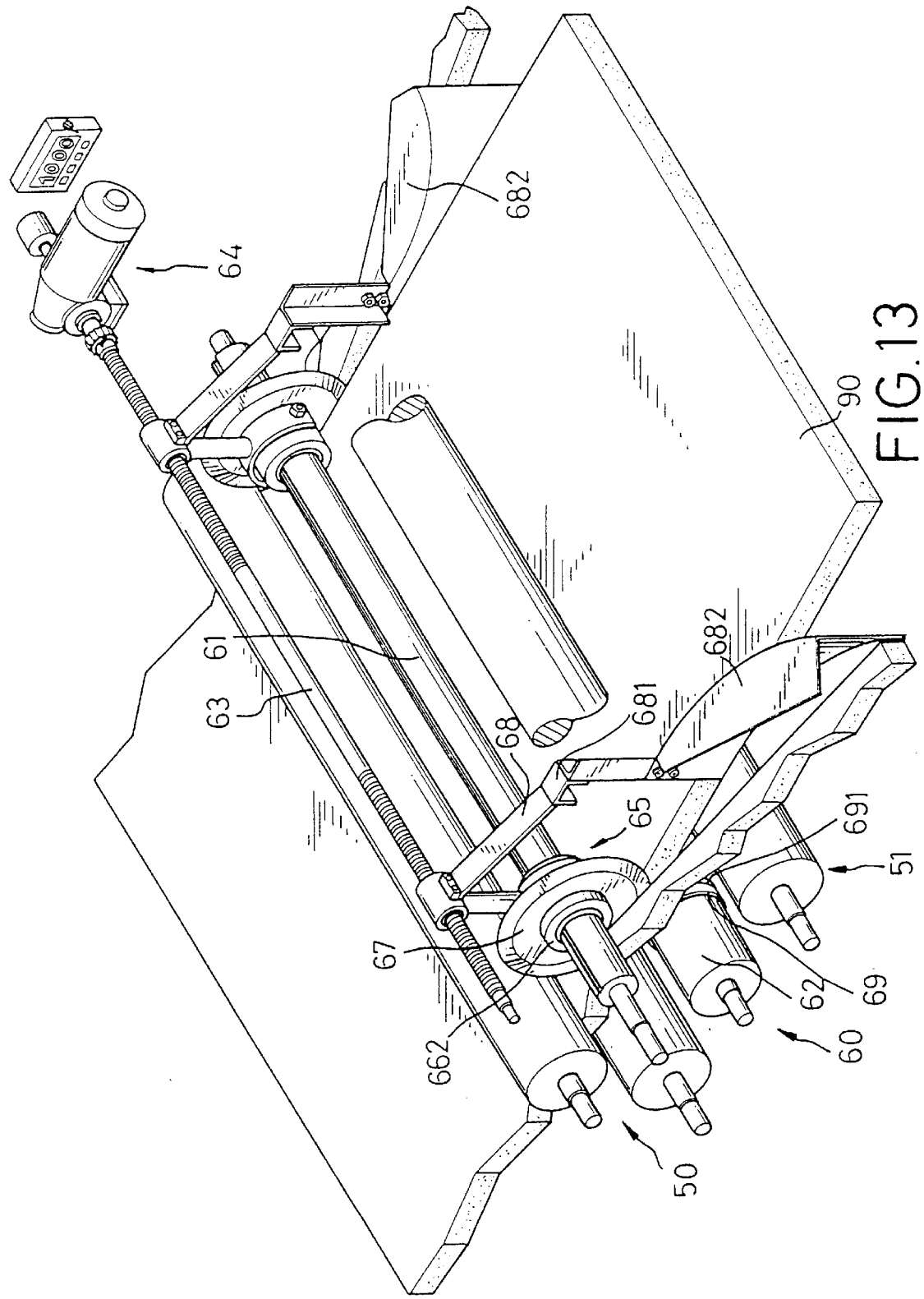
FIG. 13 is a perspective view of a side cutting assembly of the machine in accordance with the present invention.
Figure 14:
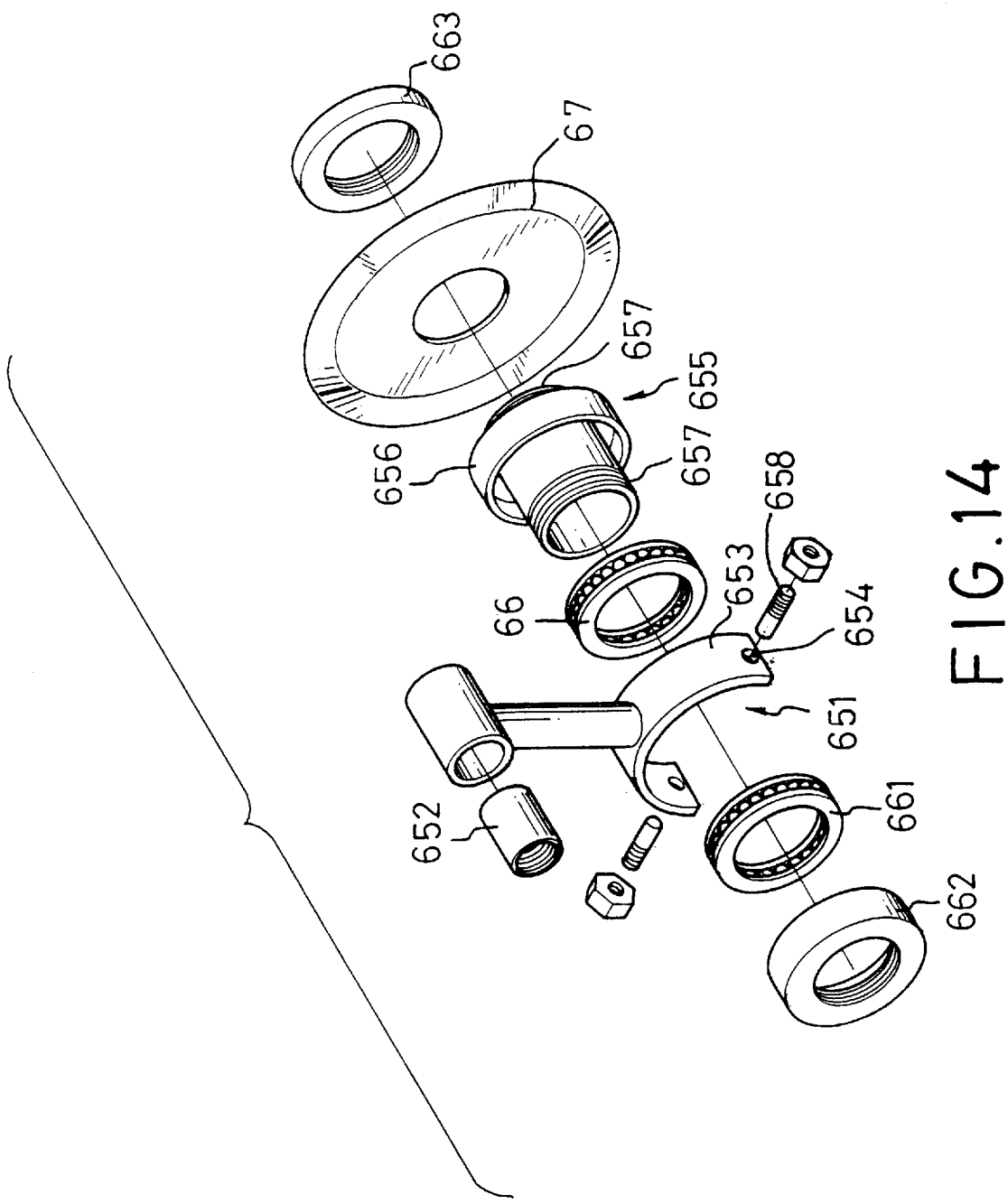
FIG. 14 is an exploded view of the cutter subassembly of the side cutting assembly in FIG. 11.

Referring to FIG. 13, a positioning bracket 68 extends from the upper end of each positioning seat 651 and includes a substantially inverted U-shaped member 681 to which an arc-shaped waste material guiding member 682 is securely attached for guiding waste material. A pair of anvil wheels 69 are mounted around the lower guiding axle 62 and each of which has an annular groove 691 for receiving the edge of the cutter 67. Referring to FIG. 1, a transmitting device 611 is provided to drive the upper guiding axle 61 as well as the cutters 67 for cutting the material plate 90 and includes a motor 612 with an output gear 613 which drives a gear 615 mounted on the upper axle 61 via a chain 614.

Figure 16:
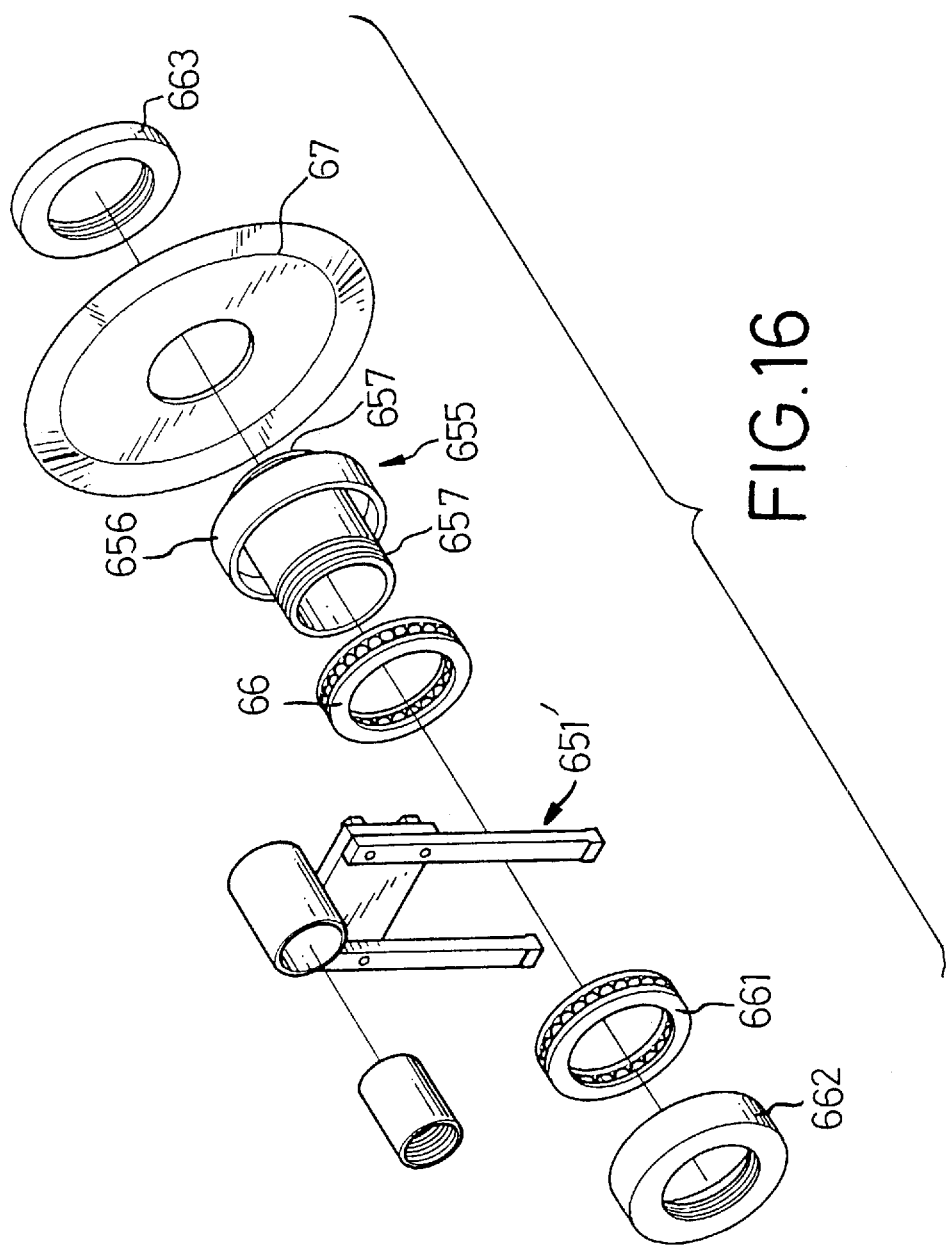
FIG. 16 is another embodiment of the cutter subassembly of the side cutting assembly.

Referring to FIG. 15, when adjusting the distance between the cutters 67, the motor 64 rotates the adjusting screw 63 to cause the cutters 67 (together with the anvil wheels 69) to move toward or away from each other under the provision of the different screw directions in the adjusting screw 63 and the provision of the freely rotational sleeve 652 of the positioning seat 651. Provision of the thrust bearings 66 and 661 allows adjustment during rapid rotation of the cutters 67. FIG. 16 shows another embodiment of the positioning seat 651' which is a substantially inverted U-shaped member for mounting the cutter 67. The occupied space of the machine is reduced since the side cutting assembly 60 is directly mounted between the second and third transportation assemblies.

Referring to FIG. 1, mounted behind a rear end of the third transportation assembly 51 is an inclined plate 53 behind which the reel assembly 70 is mounted. Further referring to FIG. 17, the reel assembly 70 includes an axle 712 mounted between a pair of spaced vertical beams 72 (only one is shown) and a reel 71 rotatably mounted on the axle 712. The reel 71 is substantially cylindrical and has a rim formed in each of two ends thereof. Each beam 72 includes two beam members 721 and 723 which are connected by hinges 725. Beam member 721 has a plurality of spaced brackets 722, while beam member 723 has corresponding latches 724 pivoted thereto. When the latches 724 are in unlocked positions, beam member 723 may be rotated through 90° [for removal of the reel 71]. Furthermore, a front wheel 75 and a rear wheel 751 are mounted below the reel 71 and are driven by a motor 73 and a chain 74. A hook means 76 extends from a lower end of each vertical beam 72 for engaging with an associated cutout 711 in the reel 71 when the reel 71 is in its lowermost position, such that the cutout 711 faces the machine.

Figure 18:
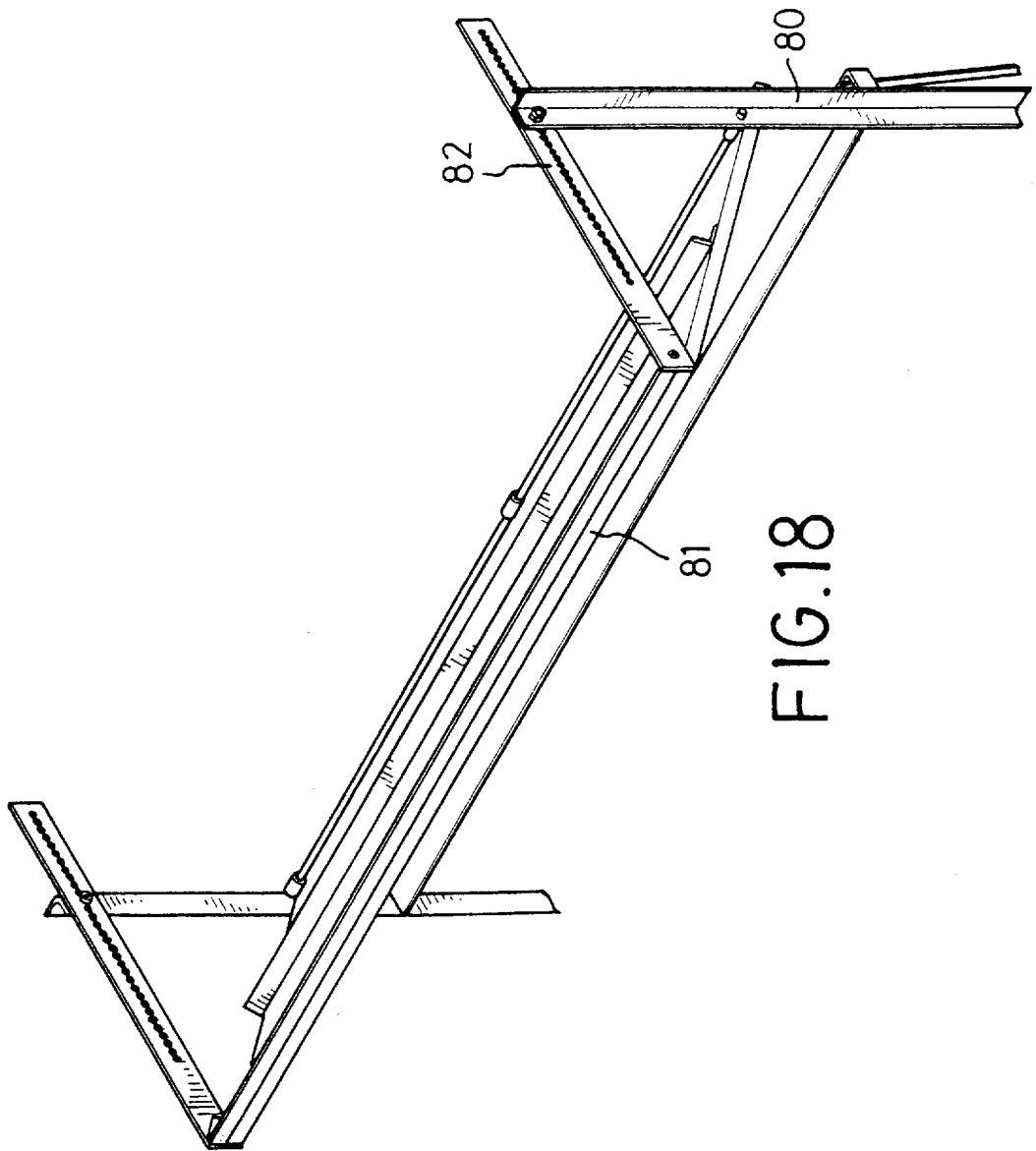
FIG. 18 is a mirror arrangement on a frame of the machine in accordance with the present invention.

Referring to FIGS. 1 and 18, a mounting frame 80 is provided above the space between the front and rear clamping assemblies 15 and 37 for mounting an inclined mirror 81 whose inclination can be adjusted by an adjusting plate 82 for reflecting the status of cutting and fusing. Thus, the worker does not need to patrol back and forth between the movable table means 30 and the feeding table.

The machine in accordance with the present invention is controlled by a control box and "electric eyes" which are installed at proper locations to detect whether trouble occurs or not. Referring to FIG. 1, electric eye 83 detects the distance traveled by the front end of the raw material plate relative to the front clamping assembly 15 in order to stop the lower rotational wheel 142 and causes the front clamping assembly 15 to clamp the raw material plate for proceeding with the cutting of the front end of the raw material plate. Electric eye 84 detects the past distance of the front end of the raw material plate relative to the movable table means 30 in order to urge cylinder 34 to carry the clamping plate 35 downwardly to clamp the front end of the raw material plate and to urge the upper positioning wheel 141 to move upwardly. Electric eye 85 detects the past distance of the rear end of the raw material plate in order to stop the lower rotational wheels 502 and 512 and to urge the movable plate 38 of the rear clamping assembly 37 to move downwardly to clamp the rear end of the raw material plate for subsequent cutting of said rear end. Motors, sprockets, chains, and detectors are provided to control the length of the raw material plate, thereby providing an automatic machine.

Figure 19:
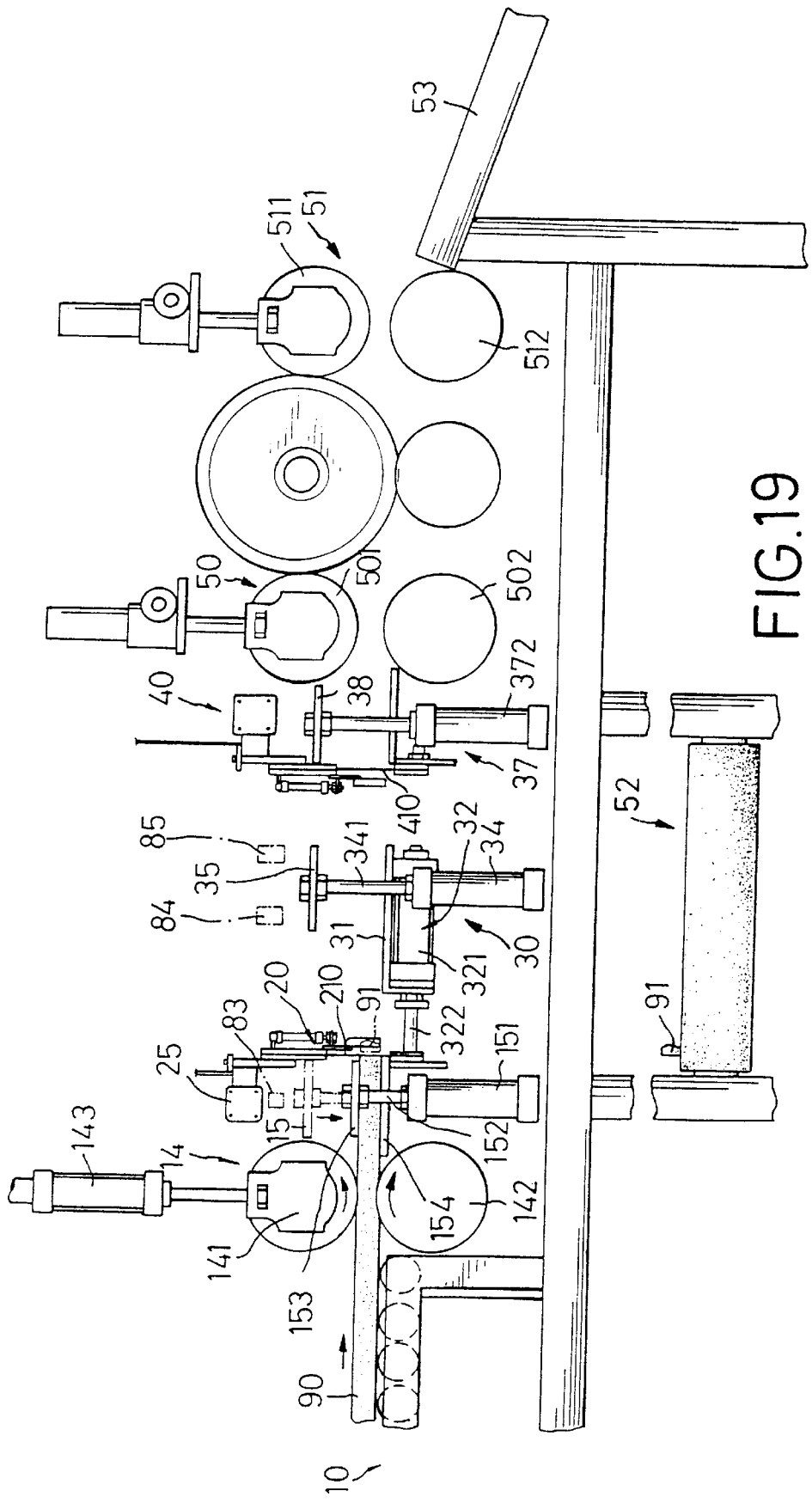
FIGS. 19 through 23 are schematic side views illustrating operation of the machine in accordance with the present invention.

FIGS. 19 through 23 illustrate operation of the machine. Referring to FIG. 19, after being foamed, a raw PE or EVA material plate 90 still has an irregular perimeter and is manually fed into the feeding assembly 10 which transmits it to the first transportation assembly 14. The upper positioning wheel 141 is in its lower position, and the raw material plate 90 is carried rightwards by the lower rotational wheel 142 until the front end thereof passes through the front heating blade 210. Under detection of electric eye 83, the lower rotational wheel 142 stops and the piston rods 152 of cylinders 151 carry the movable plate 153 of the front clamping assembly 15 downwardly to clamp the raw material plate 90. Then, cylinder 25 carries the front heating blade 210 horizontally to cut the front edge of material plate 90, and the waste material 91 falls on the waste material conveyor 52 and thus is carried to a waste container.

Figure 20:
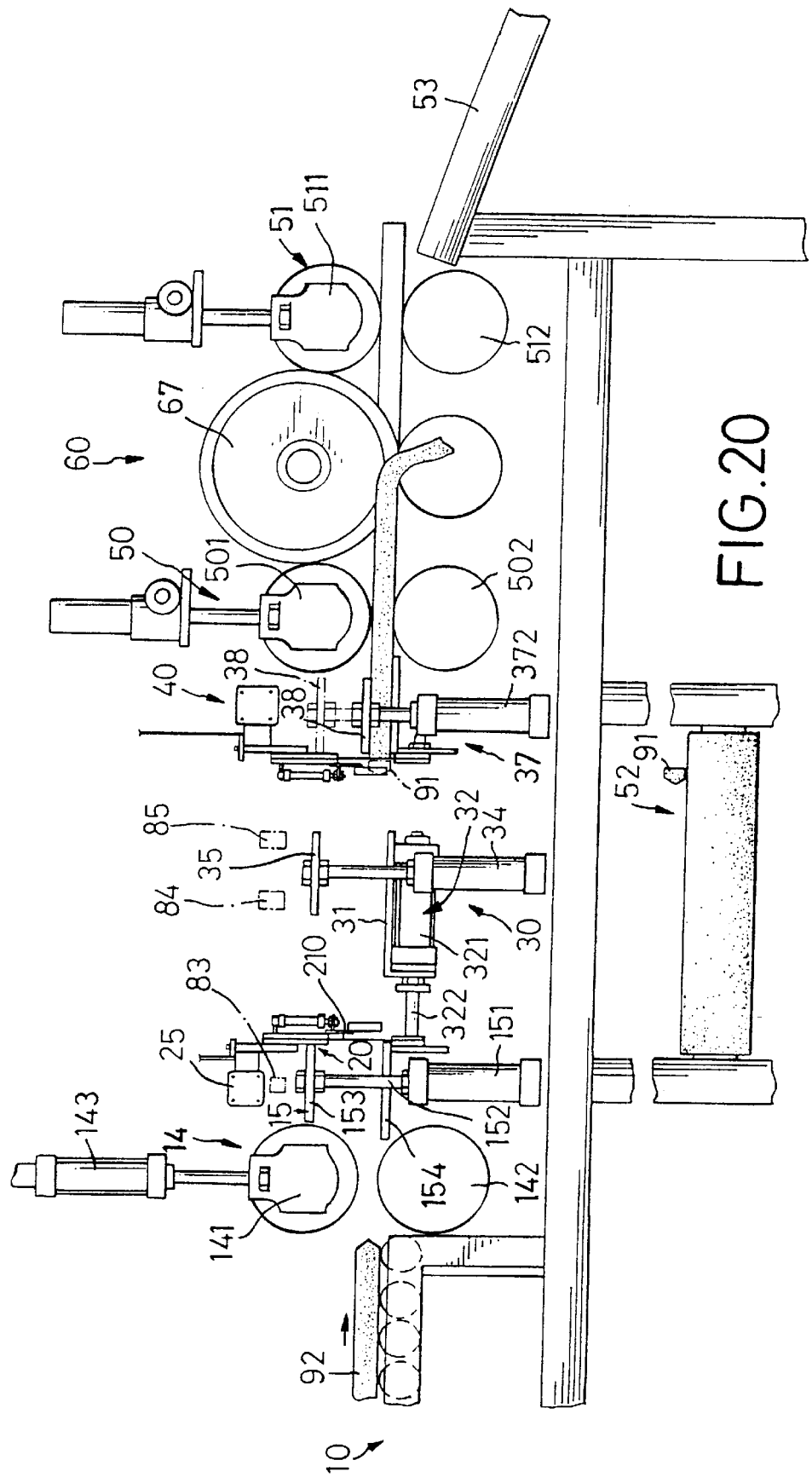

Referring to FIG. 20, thereafter, the lower rotational wheel 142 again moves the raw material plate 90 rightwards during which sides of the raw material plate 90 are cut by the cutters 67 of the side cutting assembly 60 and the waste material after cutting is dispensed by the guiding member 682 [not shown in this Figure]. When the raw material 90 has moved past electric eye 85 for a pre-determined distance, the lower rotational wheels 502 and 512 and cutters 67 stop simultaneously. Thereafter, the movable plate 38 of the rear clamping assembly 37 moves downwardly to clamp the rear end of the raw material plate 90, and the rear heating blade 42 is actuated to move horizontally to cut the rear end of the raw material plate 90 and during the cutting the front heating blade 210 is returned to its original position.

Figure 21:
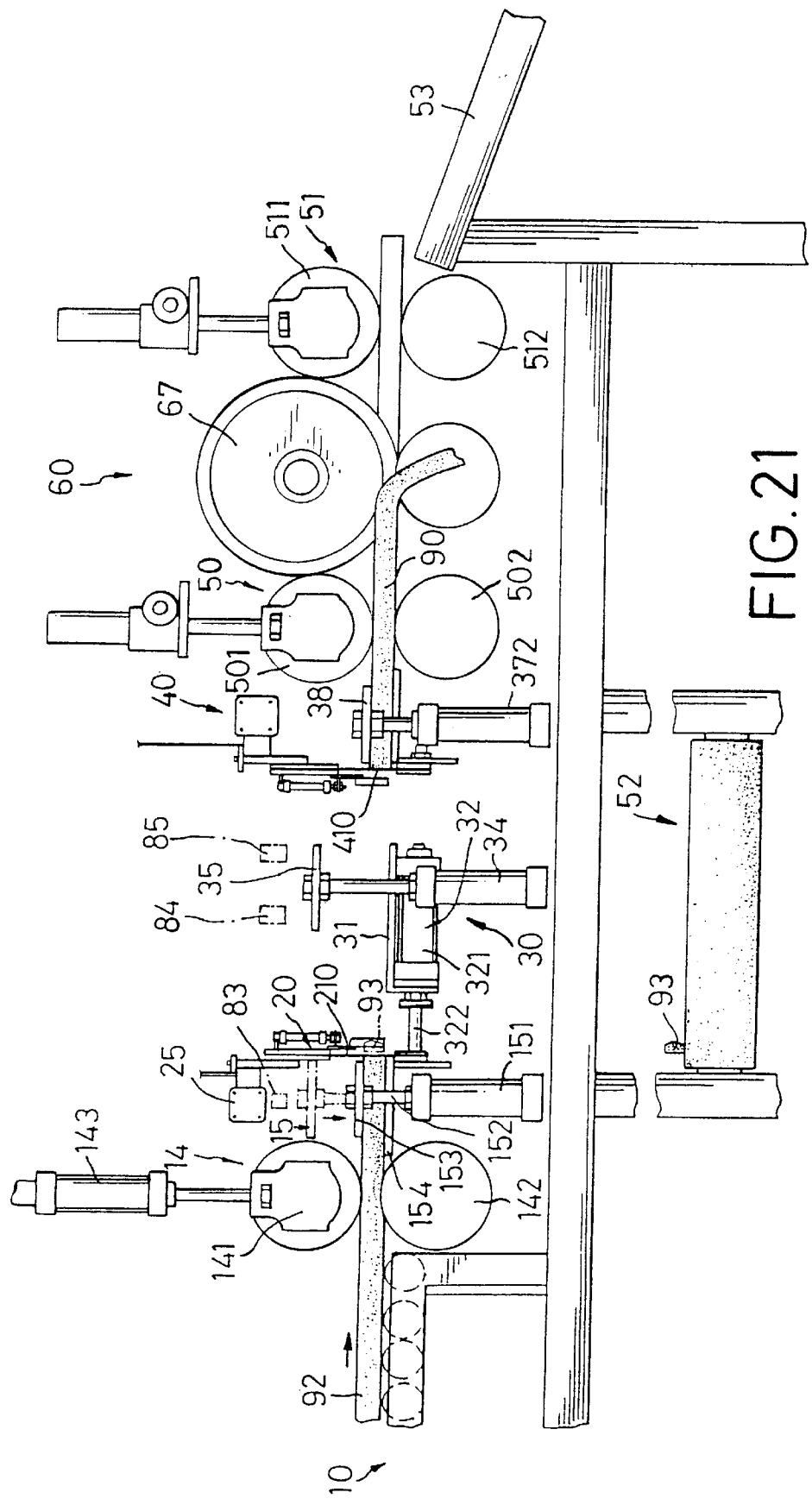

Referring now to FIG. 21, a new raw material plate 92 is fed and its front end is cut by the front heating blade 210. The feeding and cutting operations for the raw material plate 92 are as described above except that the waste material is now identified by reference numeral "92".

Figure 22:
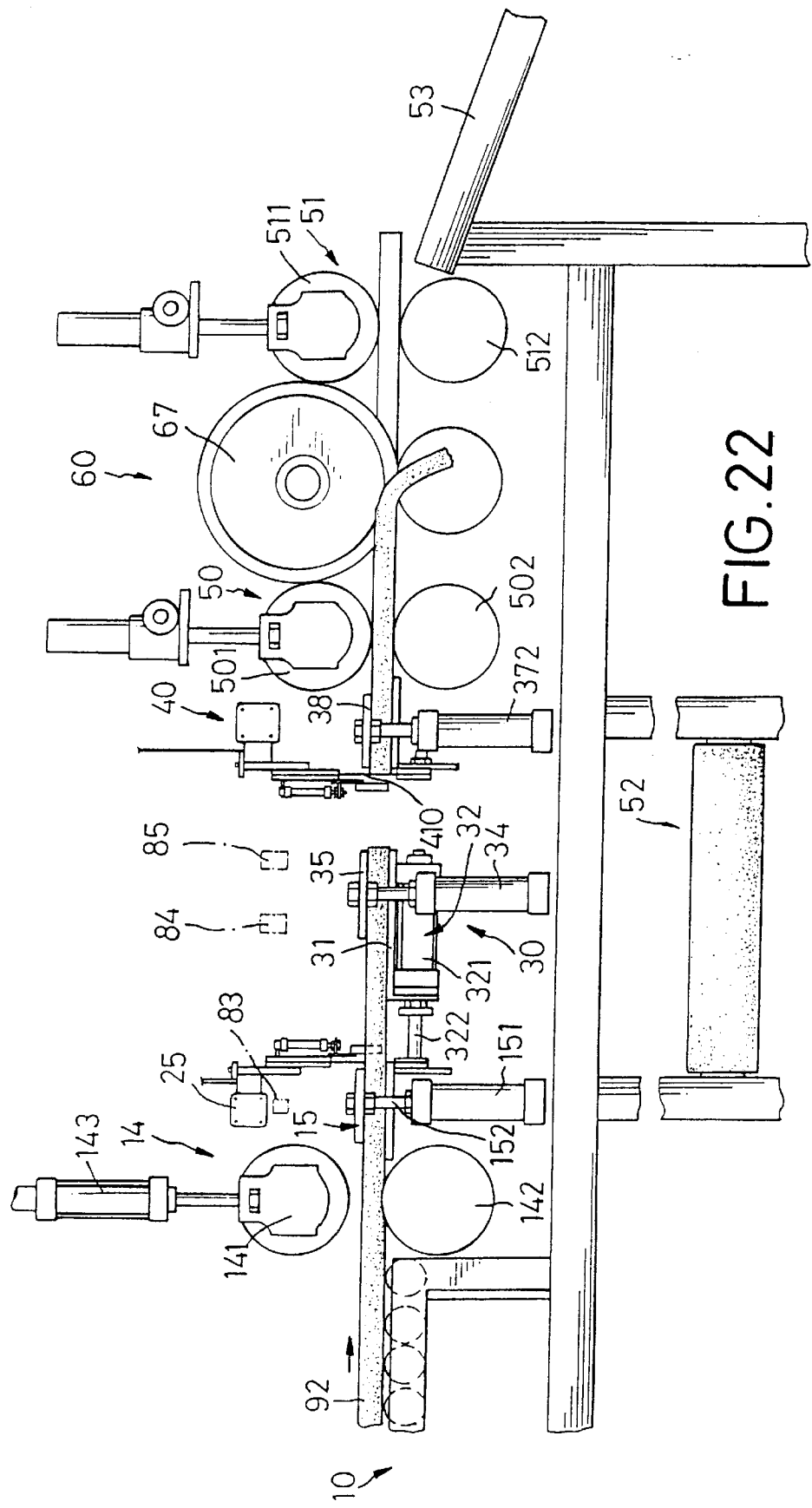

Now turning to FIG. 22, the lower rotational wheel 142 again moves the raw material plate 92 rightwards. The vertical cylinder 34 of the movable table means 30 urges the clamping plate 35 to move downwardly to clamp the front end of the raw material plate 92. Then, the whole movable table means 30 is urged rightwards by horizontal cylinder 32 toward material plate 90 during which the upper positioning wheel 141 is lifted to allow smooth rightward movement of raw material plate 92 until material plates 90 and 92 contact with each other. Thereafter, the rear heating blade 42 passes through the contact surface between the two material plates 90 and 92 to fuse them together by melting opposing edges thereof. Subsequently, the cutters 67 rotate and then the lower positioning wheels 502 and 512 rotate to cut the sides of material plate 92 during the further rightward movement of the latter for reeling it. The machine can be operated by only one worker, who is only required in the feeding procedure.

Figure 17:
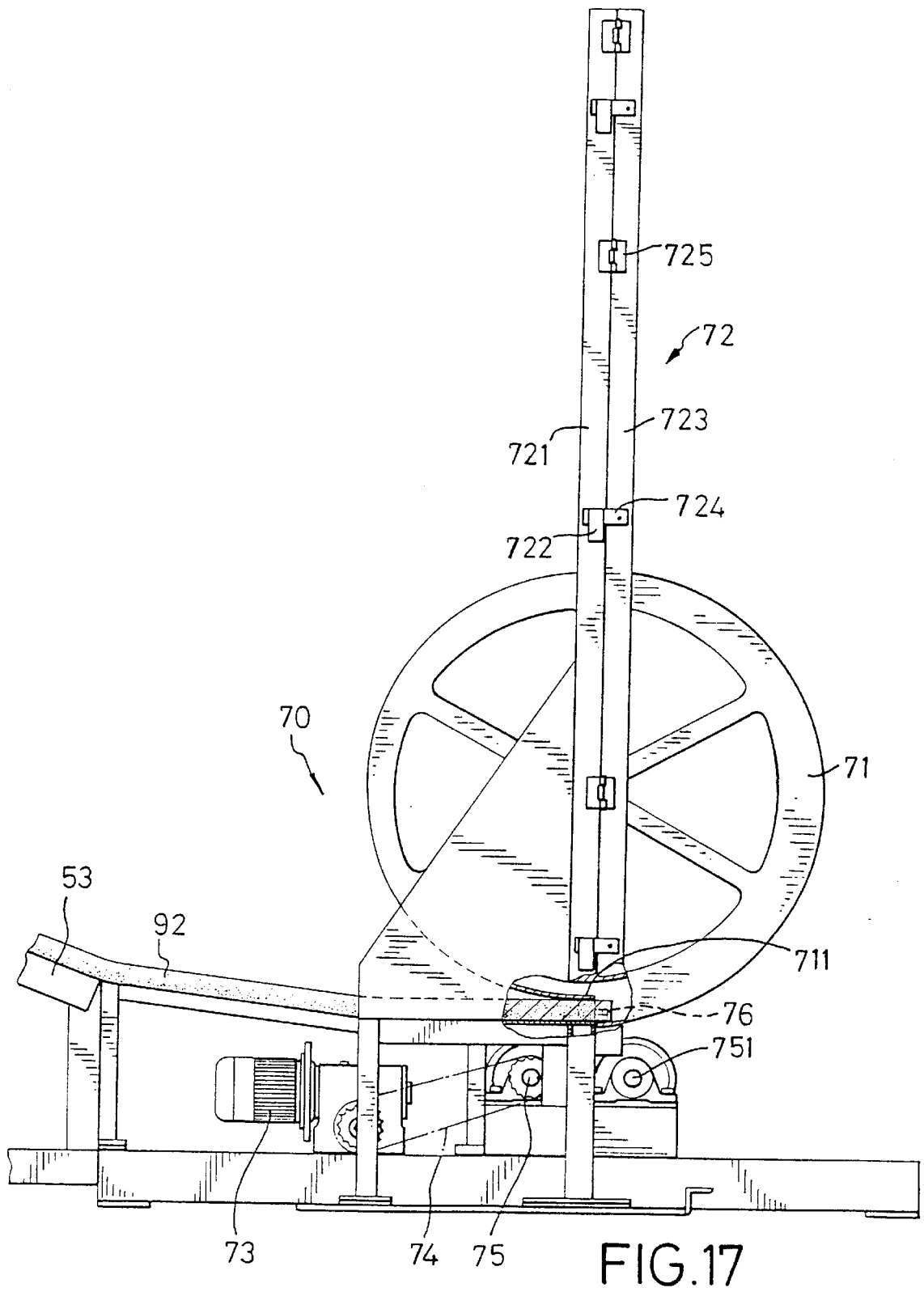
FIG. 17 is a side elevational view of a reel assembly of the machine in accordance with the present invention.
Figure 23:
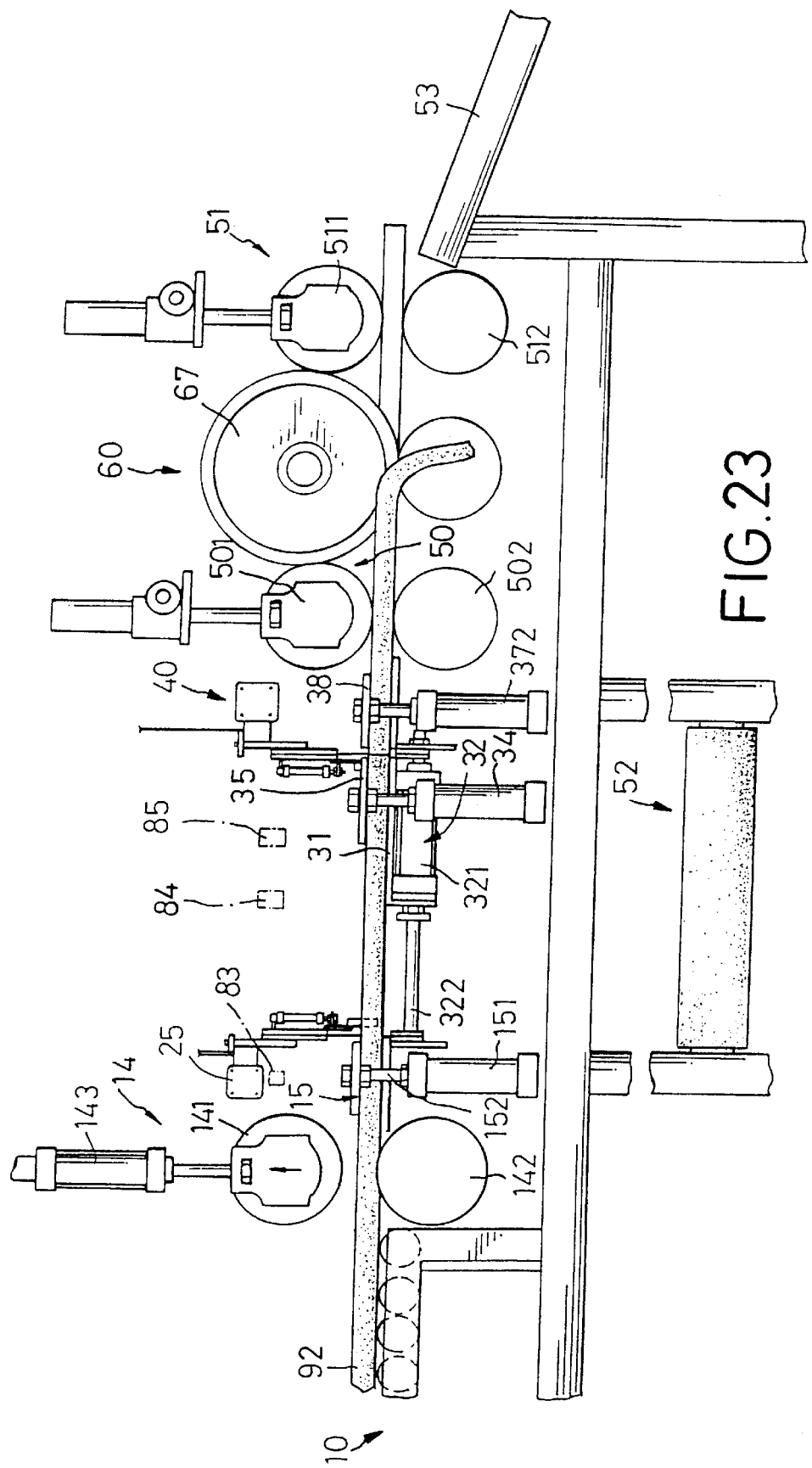

Finally, referring to FIG. 23, when the material plate 90 is to be reeled to the reel assembly 70, the movable plates 153, 38 and 35 respectively of the front and rear clamping assemblies 15 and 37 and the movable table means 30 simultaneously move upwardly, and under actuation of the lower rotational wheels 142, 502 and 512, one end of the material plate 90 engages with the cutouts 711 in the reel 71. With reference to FIG. 17, at this moment, motor 73 rotates front and rear rotational wheels 75 and 751 to further move material plate 90 rightwards and thus rotate the reel 71 to coil the material plate 90 on the reel 71. After a re-determined length of material plate is coiled around the reel 71, the machine is stopped and beam members 723 are moved away from beam members 721 for removal of the reel 71 and to replace it with a blank one. Thereafter, the blank reel 71 is lowered to its lowermost position for subsequent operation.

Although the invention has been explained in relation to its preferred embodiment, it is to be understood that many other possible modifications and variations can be made without departing from the spirit and scope of the invention as hereinafter claimed.

What is claimed is:

1. A machine for cutting, fusing, and reeling raw material plates of plastic material, the machine comprising:

a feeding assembly for feeding a raw material plate having irregular front and rear ends and two irregular sides;

a front electric heating assembly for cutting the irregular front end of the raw material plate;

a first transportation means for transporting the raw material plate fed by the feeding assembly to the front electric heating assembly;

a front clamping assembly for clamping the front end of the raw material plate to be cut;

a rear electric heating assembly for fusing the cut front end of the raw material plate and a rear end of a previously cut material plate together to form a material web and for cutting the irregular rear end of the raw material plate;

a second transportation means for transporting the raw material plate from the front electric heating assembly to the rear electric heating assembly;

a movable table means provided between the front and rear electric assemblies and movable along a feeding direction of the material plate for transporting the raw material plate and for clamping the raw material plate during the transportation;

a rear clamping assembly for clamping the rear end of the raw material plate to be cut;

a side cutting assembly for cutting the sides of the fused material web;

a reel assembly for coiling the material web; and a third transportation assembly for transporting the material web to the reel assembly;

wherein each of the front and rear electric heating assemblies comprises:

a cylinder means having a sliding block;

a heating blade unit having an upper portion, a lower portion, and a heating blade securely mounted between the upper and lower portions;

a transmitting means comprising a flexible driving member adjustably coupled to the upper portion of the heating blade unit and securely attached to the sliding block of the cylinder means and horizontally driven thereby, a flexible driven member adjustably coupled to the lower portion of the heating blade unit, and a pair of opposite vertical transmitting shafts connecting the driving member and the driven member, thereby allowing synchronous horizontal movement of the upper and lower portions of the heating blade unit under operation of the cylinder means; and a control means for controlling a stroke of the horizontal movement of the heating blade unit according to a predetermined width of the web.

2. The machine as claimed in claim 1 wherein:

the upper portion of the heating blade unit includes an upper positioning plate to which the heating blade is coupled securely attached to an upper positioning seat to which the flexible driving member of the transmitting means is adjustably coupled.

3. The machine as claimed in claim 1 wherein;

the lower portion of the heating blade unit comprises a lower positioning plate having a dovetail arrangement and a lower positioning seat having a vertical dovetail groove for engaging with the dovetail arrangement of the lower positioning plate, thereby allowing vertical sliding movement of the lower positioning plate relative to the lower positioning seat.

4. The machine as claimed in claim 1 wherein:

the pair of the opposite transmitting shafts are rotatably mounted to opposite sides of the machine respectively and each of the pair of the opposite transmitting shafts has a splined periphery upper end and a splined periphery lower end.

5. The machine as claimed in claim 1 wherein:

each of the driving member and the driven member of the transmitting means is a belt having a toothed face and two ends, the driving belt being mated around the splined periphery of the upper ends of the transmitting shafts with the toothed face thereof engaging with the splined periphery upper ends of the shafts and the two ends thereof being adjustably connected at the upper positioning seat of the heating blade unit, and the driven belt being mated around the splined periphery lower ends of the transmitting shafts with the toothed face thereof engaging with the splined periphery lower ends of the shafts and the two ends thereof being adjustably connected at the lower positioning seat of the heating blade unit.

6. The machine as claimed in claim 1 wherein the control means comprises:

two brake devices mounted on the transmitting shafts respectively for selectively stopping the rotation of the shaft;

two sensing devices electrically connected to the break devices and adjustably attached to the cylinder means for defining the stroke of the horizontal movement of the heating blade unit in accordance with the predetermined width of the web; and a trigger element mounted to the flexible driving member of the transmitting means to cooperate with the sensing devices to signal the brake devices to stop the rotation of the devices to signal the brake devices to stop the rotation of the shafts when it contacts either one of the sensing devices.

7. The machine as claimed in claim 1 wherein each of the front and rear heating blade assemblies further includes an upper guiding rail engaging with the upper positioning seat and a lower guiding rail engaging with the lower positioning seat for smoothly guiding the heating blade unit during its horizontal movement.

8. The machine as claimed in claim 1 wherein:

the feeding assembly includes a plurality of parallel feeding rollers which are freely and rotatably mounted to a frame of the machine, a positioning track is mounted to each of two sides of the frame to guide the raw material plate fed by the feeding rollers, a pair of positioning plates are mounted on the frame and extend across the feeding rollers, and a distance between the positioning plates is adjustable so as to be equal to a width of the raw material plate to be fed.

9. The machine as claimed in claim 1 wherein:

the first transportation assembly includes an upper positioning wheel and a lower rotational wheel between which the raw material plate moves, a cylinder means for vertically carrying the upper positioning wheel, and a driving means for driving the lower rotational wheel.

10. The machine as claimed in claim 1 wherein:

each of the front and rear clamping assemblies includes a fixed plate, a movable plate , and a means for effecting vertical movement of the movable plate relative to the fixed plate.

11. The machine as claimed in claim 1 wherein:

each of the front electric heating assembly and the rear heating assembly further includes electric source wires for supplying electricity to the heating blade and a protective sheath through which the electric source wires pass.

12. The machine as claimed in claim 1 further comprising a waste material dispensing device mounted to the upper portion of the heating blade unit, the dispensing device having an operative member for exerting a downward force on the waste material after the cutting of the front end of the material plate.

13. The machine as claimed in claim 12 wherein:

the dispensing device includes:

a cylinder means having a piston rod, an upper end pivoted to the upper positioning seat, and a lower end; and an operative plate having a first end pivoted to the piston rod and a second end, an operative member extending from the second end of the operative plate;

whereby the operative member exerts a downward force on the waste material upon actuation of the cylinder means after the cutting of the front end of the material plate.

14. The machine as claimed in claim 1 wherein:

the side cutting assembly includes upper and lower guiding axles mounted on the frame of the machine, a pair of spaced rings are mounted around the lower guiding axle and each of which has an annular groove in a periphery thereof, a pair of spaced cutter subassemblies are mounted on the upper guiding axle and each having a cutter for cutting irregular sides of the material plate, the cutter has an edge resting in the annular groove, an adjusting screw is rotatably mounted to an upper part of the cutter subassemblies and includes first and second threaded ends having different threading direction from each other, and means for driving the adjusting screw for adjusting a distance between the cutters in response to a change in a width of the material plate.

15. The machine as claimed in claim 1 wherein:

each of the second and third transportation assemblies includes an upper positioning wheel and a lower rotational wheel between which the raw material plate moves, a means for vertically carrying the upper positioning wheel, and a driving means for driving the lower rotational wheel.

16. The machine as claimed in claim 1 wherein:

the reel assembly includes a pair of spaced vertical beams, an axle mounted between the vertical beams and which is vertically movable, and a reel rotatably mounted on the axle, the reel is substantially cylindrical with two ends, a rim is formed in each of the two ends and has a cutout in a periphery thereof, and a hook means extends from a lower end of each vertical beam for engaging with the cutout in the reel when the reel is in a lowermost position thereof.

17. The machine as claimed in claim 16 further comprising a rotational wheel for effectively coiling the material web to the reel and a motor for driving the rotational wheel.

18. The machine as claimed in claim 16 wherein:

each of the beams includes a first beam member and a second beam member detachably connected to the first beam member for removal of the reel.

19. The machine as claimed in claim 1 further comprising:

a mounting frame mounted above a space between the front and rear clamping assemblies, an inclined mirror being mounted on the mounting frame for viewing the status of cutting and fusing.

20. The machine as claimed in claim 19 further comprising an adjusting plate for adjusting an inclination of the mirror.

21. The machine as claimed in claim 1 further comprising means for detecting a distance traveled by the raw material plate relative to the front clamping assembly, the movable table means, and the rear electric heating assembly.

22. A machine for cutting, fusing, and reeling raw material plates of plastic material, the machine comprising:

a feeding assembly for feeding a raw material plate having irregular front and rear ends and two irregular sides;

a front electric heating assembly for cutting the irregular front end of the raw material plate;

a first transportation means for transporting the raw material plate fed by the feeding assembly to the front electric heating assembly;

a front clamping assembly for clamping the front end of the raw material plate to be cut;

a rear electric heating assembly for fusing the cut front end of the raw material plate and a rear end of a previously cut material plate together to form a material web and for cutting the irregular rear end of the raw material plate;

a second transportation means for transporting the raw material plate from the front electric heating assembly to the rear electric heating assembly;

a movable table means provided between the front and rear electric assemblies and movable along a feeding direction of the raw material plate for transporting the raw material plate and for clamping the raw material plate during the transportation;

a rear clamping assembly for clamping the rear end of the raw material plate to be cut;

a side cutting assembly for cutting the sides of the fused material web;

a reel assembly for coiling the material web; and a third transportation assembly for transporting the material web to the reel assembly;

wherein each of the front and rear electric heating assemblies comprises:

a cylinder means having a sliding block;

a heating blade unit having an upper portion, a lower portion, and a heating blade securely mounted between the upper and lower portions;

a transmitting means comprising a driving toothed belt adjustably coupled to the upper portion of the heating blade unit and securely attached to the sliding block of the cylinder means and horizontally driven thereby, a driven toothed belt adjustably coupled to the lower portion of the heating blade unit, and a pair of opposite vertical transmitting shafts connecting the driving and driven toothed belts, thereby allowing synchronous horizontal movement of the upper and lower portions of the heating blade unit under operation of the cylinder means, wherein the pair of the opposite transmitting shafts are rotatably mounted to opposite sides of the machine respectively and each of the pair of the opposite transmitting shafts has a splined periphery upper end and a splined periphery lower end, and wherein each of the driving and driven toothed belt has a toothed face, the driving toothed belt being mated around the splined periphery of the upper ends of the transmitting shafts with the toothed face thereof engaging with the splined periphery upper ends of the shafts, and the driven belt being mated around the splined periphery lower ends of the transmitting shafts with the toothed face thereof engaging with the splined periphery lower ends of the shafts; and a control means for controlling a stroke of the horizontal movement of the heating blade unit according to a predetermined width of the web.

23. The machine as claimed in claim 22 wherein:

the upper portion of the heating blade unit includes an upper positioning plate by which the heating blade is coupled securely attached to an upper positioning seat to which the driving toothed belt of the transmitting means is adjustably coupled, and wherein the lower portion of the heating blade unit comprises a lower positioning plate having a dovetail arrangement and a lower positioning seat having a vertical dovetail groove for engaging with the dovetail arrangement of the lower positioning plate, thereby allowing vertical sliding movement of the lower positioning plate relative to the lower positioning seat.

24. The machine as claimed in claim 23 wherein:

each of the driving toothed belt and the driven toothed belt of the transmitting means has two ends, the two ends of the driving toothed belt being adjustably connected at the upper positioning seat of the heating blade unit, and the two ends of the driven toothed belt being adjustably connected at the lower positioning seat of the heating blade unit.

25. The machine as claimed in claim 22 wherein the control means comprises:

two brake devices mounted on the transmitting shafts respectively for selectively stopping the rotation of the shaft;

two sensing devices electrically connected to the break devices and adjustably attached to the cylinder means for defining the stroke of the horizontal movement the heating blade unit in accordance with the predetermined width of the web; and a trigger element mounted to the driving toothed belt of the transmitting means to cooperate with the sensing devices to signal the brake devices to stop the rotation of the shafts when it contacts either one of the sensing devices.

26. The machine as claimed in claim 23 wherein each of the front and rear heating blade assemblies further includes an upper guiding rail engaging with the upper positioning seat and a lower guiding rail engaging with the lower positioning seat for smoothly guiding the heating blade unit during its horizontal movement.

* * * * *